(12) United States Patent
Nitidharmatut et al.

(10) Patent No.: US 11,553,082 B2
(45) Date of Patent: *Jan. 10, 2023

(54) SIMULTANEOUS VOICE AND DATA CONTENT DRIVEN COMMERCIAL DATA PLATFORM

(71) Applicants: Trysit Nitidharmatut, Bangkok (TH); Timothy Maslyn, Cupertino, CA (US); Vira Intanate, Samutprakarn (TH)

(72) Inventors: Trysit Nitidharmatut, Bangkok (TH); Timothy Maslyn, Cupertino, CA (US); Vira Intanate, Samutprakarn (TH)

( * ) Notice: Subject to any disclaimer, the term of this patent is extended or adjusted under 35 U.S.C. 154(b) by 0 days.

This patent is subject to a terminal disclaimer.

(21) Appl. No.: 17/340,600

(22) Filed: Jun. 7, 2021

(65) Prior Publication Data

US 2021/0297527 A1    Sep. 23, 2021

Related U.S. Application Data

(63) Continuation-in-part of application No. 15/931,447, filed on May 13, 2020, now Pat. No. 11,032,423,
(Continued)

(51) Int. Cl.
*H04M 3/00* (2006.01)
*H04M 3/42* (2006.01)
(Continued)

(52) U.S. Cl.
CPC ..... *H04M 3/42102* (2013.01); *H04M 3/2227* (2013.01); *H04M 3/2254* (2013.01);
(Continued)

(58) Field of Classification Search
CPC ........... H04M 3/42102; H04M 3/2227; H04M 3/2254; H04M 3/247; H04M 3/42348; H04M 15/41; H04M 3/493
(Continued)

(56) References Cited

U.S. PATENT DOCUMENTS 5,544,231 A    8/1996    Cho
6,327,343 B1   12/2001   Epstein et al.
(Continued)

FOREIGN PATENT DOCUMENTS

WO    2016085258 A1    6/2016
WO    2016189350 A1    12/2016

OTHER PUBLICATIONS

First Examination Report dated Apr. 13, 2022 from Indian Application No. 202027016266, 5 pages.
(Continued)

*Primary Examiner* — William J Deane, Jr.
(74) *Attorney, Agent, or Firm* — Daylight Law, P.C.

(57) ABSTRACT

One disclosed system includes dialer device with a dialer identifier that initiates a call with a receiver device with a receiver identifier over a voice channel. A database stores: interaction data in association with both the receiver identifier and the dialer identifier; a content quality metric in association with the interaction data; and a network topology in which the receiver identifier and the dialer identifier are associated with nodes and are connected by an edge. A server is programmed to: update, based on the content quality metric and the network topology, a rankings associated with the receiver identifier and the dialer identifier; and one of: surface the ranking associated with the dialer identifier and the ranking associated with the receiver identifier to an external searching agent using an external data channel and without using any voice channel; or rank the dialer identifier for an internal searching agent using the ranking.

20 Claims, 11 Drawing Sheets

Related U.S. Application Data which is a continuation-in-part of application No. 16/730,882, filed on Dec. 30, 2019, now Pat. No. 10,904,382, which is a continuation-in-part of application No. 16/176,113, filed on Oct. 31, 2018, now Pat. No. 10,764,428.

(60) Provisional application No. 62/611,690, filed on Dec. 29, 2017.

(51) Int. Cl.
*H04M 3/22* (2006.01)
*H04M 15/00* (2006.01)
*H04M 3/24* (2006.01)
*H04M 3/493* (2006.01)

(52) U.S. Cl.
CPC ....... *H04M 3/247* (2013.01); *H04M 3/42348* (2013.01); *H04M 15/41* (2013.01); *H04M 3/493* (2013.01)

(58) Field of Classification Search
USPC ....................... 379/207.13, 207.01
See application file for complete search history.

(56) References Cited

U.S. PATENT DOCUMENTS

| | | | |
|---|---|---|---|
| 6,987,841 B1 | 1/2006 | Byers et al. | |
| 7,277,445 B2 | 10/2007 | Bartfeld et al. | |
| 7,379,881 B2 | 5/2008 | Smithies et al. | |
| 7,418,090 B2 | 8/2008 | Reding et al. | |
| 8,036,355 B2 | 10/2011 | Velarde | |
| 8,107,613 B2 | 1/2012 | Gumbula | |
| 8,320,536 B2 | 11/2012 | Portman et al. | |
| 8,335,299 B1 | 12/2012 | Crandall et al. | |
| 8,428,559 B2 | 4/2013 | Silva | |
| 8,510,116 B1 | 8/2013 | Moy et al. | |
| 8,675,638 B2 | 3/2014 | Croak et al. | |
| 8,687,786 B2 | 4/2014 | Chiczewski et al. | |
| 8,761,353 B1* | 6/2014 | Apple | H04M 15/08 379/207.02 |
| 8,897,428 B2 | 11/2014 | Walker et al. | |
| 10,431,209 B2* | 10/2019 | Bhaya | H04L 67/535 |
| 2002/0152142 A1 | 10/2002 | Schellmann et al. | |
| 2002/0168967 A1 | 11/2002 | Clapper | |
| 2003/0097438 A1* | 5/2003 | Bearden | H04L 41/12 709/224 |
| 2003/0220835 A1 | 11/2003 | Barnes | |
| 2005/0125342 A1 | 6/2005 | Schiff | |
| 2005/0286708 A1 | 12/2005 | Slosberg et al. | |
| 2006/0056599 A1 | 3/2006 | Cragun | |
| 2006/0285662 A1 | 12/2006 | Yin | |
| 2007/0135101 A1 | 6/2007 | Ramati | |
| 2007/0269025 A1* | 11/2007 | Shieh | H04M 3/42221 379/67.1 |
| 2009/0086010 A1 | 4/2009 | Tiphane | |
| 2012/0257002 A1 | 10/2012 | Stocker | |
| 2013/0035054 A1 | 2/2013 | Ashton | |
| 2014/0254437 A1 | 9/2014 | Koch | |
| 2015/0149290 A1 | 5/2015 | Ashton | |
| 2016/0119477 A1* | 4/2016 | Sharpe | G06Q 30/0261 379/265.09 |
| 2017/0013129 A1 | 1/2017 | Rotsztein | |
| 2017/0192735 A1 | 7/2017 | Faran | |

OTHER PUBLICATIONS

Notice of Allowance dated Jan. 11, 2022 from Chinese Patent Application No. 201880082706.3, 2 pages.
Extended European Search Report dated Jun. 21, 2021 from European Application No. 18895105.7, 10 pages.
Spasovski et al., "Proof of Stake Blockchain: Performance and Scalability for Groupware Communications", Proceedings of the 9th International Conference on Management of Digital Ecosystems, Nov. 7, 2017, pp. 251-258, retrieved from the Internet: URL:https://dl.acm.org/doi/pdf/10.1145/3167020.3167058.
First Office Action from Chinese Application No. 201880082706.3 dated May 25, 2021, 22 pages.
Final Office Action dated Oct. 1, 2020 from U.S. Appl. No. 16/730,882, 9 pages.
International Search Report and Written Opinion from International Application No. PCT/2020/065705, 6 pages.
International Search Report and Written Opinion from International Application No. PCT/US2018/061450 dated Feb. 7, 2019, 11 pages.
Nonfinal Office Action dated Aug. 5, 2020 from U.S. Appl. No. 16/730,882. (not required per Eric).
Nonfinal Office Action dated Mar. 19, 2020 from U.S. Appl. No. 16/730,882.
Nonfinal Office Action dated Oct. 6, 2020 from U.S. Appl. No. 15/931,447, 21 pages.
Nonfinal Office Action dated Sep. 18, 2019 from U.S. Appl. No. 16/176,113, 27 pages.
Notice of Allowance dated Feb. 4, 2021 from U.S. Appl. No. 15/931,447, 20 pages.
Notice of Allowance dated Mar. 20, 2020 from U.S. Appl. No. 16/176,113, 12 pages.
Notice of Allowance dated Oct. 20, 2020 from U.S. Appl. No. 16/730,882, 16 pages.
C. Franky, "Skype For Business Server—Where is Conversation History Stored", Sep. 9, 2016, XP055913850, Retrieved from the Internet: URL:https://answers.microsoft.com/en-us/skype/forum/all/skype-for-business-server-where-is-conversation/27d7ac85-9c93-4eb5-8edb-ae47d56ee2eb [retrieved on Apr. 20, 2022].
First Examination Report dated Apr. 26, 2022 from European Application No. 18895105.7, 9 pages.

\* cited by examiner

201 Phonefully User - key Phone Num, Auth Level

| userID | phoneNum | authLevel | type | configID | desc | ... |
|---|---|---|---|---|---|---|
| 0 | 9999999999 | 5 | Phonefully | 0 | Phonefully Entity | ... |
| 1 | 1112223333 | 5 | Business | 1 | Mario's Pizza Friend | ... |
| 2 | 1112223333 | 1 | Business | 2 | Mario's Pizza New Cust | ... |
| 3 | 1112223333 | 5 | Personal | 3 | Mario Personal | ... |
| 4 | 9998887777 | 5 | Personal | 1 | Vira Personal | ... |
| ... | | | | | | |
| 5 | 2223334444 | 5 | Business | 1 | Lucia's Pizzeria | ... |
| 6 | 8887776666 | 1 | Personal | 1 | Travis Howard - uknown | ... |
| 7 | 8887776666 | 5 | Personal | 2 | Travis Howard - friend | ... |
| ... | | | | | | |

202 Phonefully User Relationship - relationshipID

| relationshipID | userID | userID2 | firstRelated | ... |
|---|---|---|---|---|
| 123 | 1 | 4 | 20170809 | ... |
| 234 | 2 | 6 | 20170905 | ... |
| 567 | 4 | 7 | 20170908 | ... |
| 789 | 1 | 5 | 20170707 | ... |
| ... | | | | |

203 Phonefully Interaction Fact

| interactID | callerID | receiverID | initiatedBy | interactionType | contentID | amount | time | ... |
|---|---|---|---|---|---|---|---|---|
| 1 | 4 | 1 | C | 0 | 8888 | 0 | 20170908O1 | ... |
| 2 | 1 | 4 | R | 1 | 8888 | 0 | 20170908O1 | ... |
| 3 | 4 | 1 | C | 2 | 2221 | 1 | 20170908O2 | ... |
| 4 | 4 | 1 | R | 3 | 2221 | 1 | 20170908O3 | ... |
| 5 | 7 | 5 | C | 4 | 3333 | 0 | 20170908O8 | ... |
| 6 | 5 | 7 | R | 1 | 8888 | 0 | 20170908O1 | ... |
| 7 | 7 | 4 | C | 5 | 8888 | 0 | 20170908O4 | ... |
| 8 | 7 | 4 | R | 6 | 6767 | 3 | 20170908O8 | ... |
| 9 | 7 | 4 | C | 7 | 6767 | 2 | 20170908O12 | ... |
| 10 | 7 | 5 | C | 1 | 6767 | 1 | 20170908O45 | ... |
| ... | | | | | | | | |

204 Phonefully User Content contentID

| contactID | userID | contentType | timeEntered | source | ... |
|---|---|---|---|---|---|
| 1112 | 1 | storefront1 | 20170909O1234 | https://www.google.com/... | ... |
| 2221 | 1 | coupon1 | 20170910O1535 | https://www.marios.com/... | ... |
| 3333 | 1 | photo | 20170908O1825 | IMexchange | ... |
| 4321 | 2 | coupon2 | 20170910O7645 | https://www.marios.com | ... |
| 1234 | 2 | storefront1 | 20170908O1855 | https://www.google.com/L... | ... |
| 4444 | 0 | gold coin | 20170911O0000 | Mario coin bank | ... |
| 8888 | 0 | phone call | 0000000000000 | phonefully app | ... |
| 6767 | 5 | gold coin | 20170905O1245 | Lucia coin bank | ... |
| ... | | | | | |

205 Phonefully Interaction Type

| interactionID | interactionName | ... |
|---|---|---|
| 0 | Initiate a call | ... |
| 1 | Receive a call | ... |
| 2 | Send a coupon | ... |
| 3 | Redeem a coupon | ... |
| 4 | Share a photo | ... |
| 5 | Receive a reward | ... |
| 6 | Share a reward | ... |
| 7 | Redeem a reward | ... |
| ... | | |

FIG. 2

SIMULTANEOUS VOICE AND DATA CONTENT DRIVEN COMMERCIAL DATA PLATFORM

CROSS REFERENCE TO RELATED APPLICATIONS

This application is a continuation-in-part of U.S. patent application Ser. No. 15/931,447, filed on May 13, 2020, which is a continuation-in-part of U.S. patent application Ser. No. 16/730,882, filed on Dec. 30, 2019, which is a continuation-in-part of U.S. patent application Ser. No. 16/176,113, filed Oct. 31, 2018, which claims priority to U.S. Provisional Application No. 62/611,690, filed Dec. 29, 2017, all of which are incorporated by reference herein in their entirety for all purposes.

BACKGROUND

Every year of the information age bears witness to the continued development of more ways to allow people to communicate and disseminate information. However, person-to-person voice communication over a telephone remains one of the most effective and preferred ways for people to communicate. Even when people use the Internet to search, they often follow up their search with a phone call. Indeed, market analysts have found that 48% of local mobile web searches end with a telephone call. Furthermore, inbound telephone calls are rated as the highest quality form of sales leads because people will only tend to call a business when they are almost ready to make a purchase for goods or service. Telephone calls therefore represent a high value potential sales channel for businesses and a high value information channel for individuals.

Despite the high value of the information generated by voice interactions for both customers and businesses, the useful data associated with a voice interaction is generally lost once a call is concluded. This is particularly true for individuals and small businesses who can't afford enterprise-grade call management systems. Furthermore, for all their benefits, voice interactions can fall short in certain tasks where visible communication, augmented by simultaneously sharing data content, could be more efficient such as displaying a person's name, a restaurant order, an image of a product offering, or a credit card number to someone who is using the information to complete a transaction.

SUMMARY

This disclosure relates to a commercial data platform. The platform is based around voice communication but augments this voice communication with both the delivery and retention of valuable data regarding that voice communication. Methods and systems are disclosed that enable multiple parties to conduct real time commerce and personal interactions in a content rich and voice enabled network environment using devices that obtain content/data from, and actively write content/data to, proprietary and public web-based and cloud-based computing environments. The devices can be mobile phones with the capability to display content to their users. The same content/data is employed to enhance and personalize active and future interactions using the platform, thus providing an ecosystem for building strong, lasting, and mutually beneficial person-to-business, business-to-business, and person-to-person social relationships that further encourage and promote ongoing commerce and interactions between these parties.

Currently, when a prospective customer (dialer) dials a business (receiver) the customer will normally see only the phone number of the dialed business displayed during the entire voice call. Likewise, the business would see the phone number of the incoming caller on their device. Neither the customer nor the business currently has the opportunity during the voice call to simultaneously send data content to each other that can enrich the call experience by visually displaying information about each other, current customer needs and/or business offerings, or any information about past interactions the customer and the business may have had with each other. Methods and systems are disclosed that would provide the ability of a dialer and receiver, during the voice call itself, to share and interact with valuable data content on their respective devices that would enrich the calling experience for both parties and facilitate any potential transaction. This would include, for example, being able to share data content in real-time, view past interaction data, and store ongoing interactions during the call to further enhance current and future interactions between the parties. These approaches would thus bridge the gap between the current voice call, that is almost entirely void of data content related to the purpose of the call, and the modern Internet age where data content is displayed that visually enriches our experiences. Also, by storing the interactions and data content exchanged during a call, this invention provides a "memory" to both the caller and the receiver of the relationship between the parties, and would be the next best thing to having a person-to-person interaction.

This disclosure includes a system that enables a commercial data platform. The system includes a dialer device, a receiver device, a dialer that is programmed to initiate a call between the dialer device and the receiver device using a receiver phone number, a server, and a database. The system also includes a first interaction manager stored on the dialer device and programmed to transmit a first set of interaction data to the database during the call. The system also includes a second interaction manager stored on the receiver device and programmed to transmit a second set of interaction data to the database during the call. The server is programmed to obtain receiver content data from the database using the receiver phone number and/or other unique identifier, transmit the receiver content data to the dialer device, obtain dialer content data from the database using the dialer phone number and/or other unique identifier, transmit the dialer content data to the receiver device, and store data from both the first set of interaction data and the second set of interaction data in the database in association with both the receiver phone number and/or other unique identifier and the dialer phone number and/or other unique identifier. As used herein and in the appended claims the term "identifier" includes both a phone number or other unique identifier.

The simultaneous voice and data content driven commercial data platforms disclosed herein effectively enable a relationship manager for consumers using the simultaneous voice and data content driven commercial data platforms, thereby putting them on the same footing as large enterprises with complex relationship management software and data mining. However, using the simultaneous voice and data content driven commercial data platforms disclosed herein the consumers are able to manage their relationships with various vendors and keep track of their overall commercial endeavors on a massive scale with almost no effort required on their part besides the use of an effective communication channel with those vendors. Indeed, the simultaneous voice and data content driven commercial data platforms disclosed herein enable additional features above and beyond those offered by enterprise-grade customer relationship managers and should instead be referred to as commercial relationship managers owing to the fact that they allow for management of commercial data on both the consumer and the vendor side of a relationship. As such, the term CRM is used herein to refer to the ability of a platform to manage commercial relationships generally, and not just consumer relationships.

As mentioned previously, the simultaneous voice and data content driven commercial data platforms disclosed herein allow for the usage of CRMs on both the consumer and the vendor side of a relationship, and they do so by facilitating an effective communication channel between the consumer and the vendor. Rather than simply providing a flat, blank, call screen, some of the approaches disclosed herein add a visual layer of communication to a standard voice communication. In the approaches disclosed herein in which the consumer and/or vendor are communicating using smartphones with display screens, the commercial data platform allows for the display of information on the screen of the device during the call. The screen can be used to display information about the vendor's establishment and offerings generally, the specific good or service that is the object of the current call, the past relationships of the consumer and vendor, and any other information that can facilitate an effective interaction between the consumer and vendor for purposes of building trust and improving their business relationship.

Numerous specific examples of the above-mentioned features are provided in the detailed description below. However, to illustrate the two-fold benefit of the disclosed simultaneous voice and data content driven commercial data platforms consider the situation in which a consumer's options for a pizza order are displayed on the screen of a phone during a voice call. The display of the options enhances the consumer's selection process because the images of the pizza can be curated by the vendor to make them look appealing and to provide information that spoken words alone cannot. The inclusion of a visible channel of communication also prevents miscommunications regarding the content of the order because the order can be displayed visibly to the consumer and vendor at the same time. Numerous other benefits from a communication perspective are provided in terms of the presentation of information using the visible channel provided by the platform. In addition, the fact that this information was provided to the user via the simultaneous voice and data content driven commercial data platform allows the information to be stored for later use. The next time the consumer calls that vendor, their prior order will be available for presentation on the display or reordering in an ultra-convenient fashion. Any incentives or coupons earned based on continued patronage can also be tracked using the data. Furthermore, the history of interactions can be used by the vendor to provide the level of attention and valued respect that a repeat customer is due, or to suggest additional offerings that may be appealing to a given consumer. Therefore, just by allowing the consumer and vendor to use the platform to share images of a pizza, and the receipt of an order for that pizza, a large number of opportunities arise for enriching the commercial relationship of the consumer and vendor.

The benefits of the CRMs described above are not restricted to large enterprises. Using the simultaneous voice and data content driven commercial data platform disclosed herein, small business and individuals are able to obtain the same access to valuable commercial interaction data for commerce enrichment. The devices used by users of the platform can include basic personal computers with built-in phone dialers, smartphones, smart devices such as voice controlled household assistants with or without integrated screens, wearables with dialer connectivity, and any other device that can be used to both make a phone or voice call through VoIP messaging applications or otherwise, and present interaction data to a user. Indeed, in certain approaches, only one of the users needs access to the interaction data, and the other user can be connected only indirectly to the platform through the other user. In these examples, one user could be utilizing a basic telephone and interaction data could be sent from the other user's device to the platform. For example, one user could be operating a smartphone and inputting data to the platform using an application on their device while speaking to a user operating a basic telephone. Furthermore, although the system benefits from situations in which both users have devices that can provide voice and data to the platform, the system does not require both users to have access to the same type of devices.

The data mined, and further processed with artificial intelligence and machine learning, from usage of the simultaneous voice and data content driven commercial data platform can also be used by a large number of vendors to facilitate an entire business network and ecosystem based around the platform. For example, vendors offering complementary services can offer incentives and promotions to a user based on knowledge regarding that customer's consumption of complementary goods and services. The vendors could team up to share the cost of these incentives in exchange for an increase in customer consumption across all categories. The data could also be used to facilitate a liquid platform-centric currency offered to consumers using the commercial data platform either by the platform administrator or by vendors using the platform. The platform could track usage of the currency as it was used in user-to-user transactions on the platform. Aside from offering promotions, knowledge of a particular consumer's consumption patterns could be beneficial in terms of offering a high value potential client the attention and respect they are due even if a particular vendor had no prior interactions with that client and would not have otherwise known that they represented a high value potential business relationship. The data mined, and further processed with artificial intelligence and machine learning, could also be used by consumers to obtain recommendations for or from vendors of particular goods and services that have been consumed by other consumers using the platform with high volume or regularity. The data mined, and further processed with artificial intelligence and machine learning, could also be synthesized to provide users with information regarding the broader impact of their commercial decisions. For example, the data could be used to show how commercial transactions with a potential vendor impact a local economy vs. the broader economy, tend to lead towards income inequality across society as a whole, lead to a reduction in social good (e.g., environmental harm, support of unacceptable working conditions), result in political contributions to political groups with interests adverse to those of the purchaser, etc.

The commercial data platform of the present invention leverages interactions and accumulated lifetime values to provide user-customized experiences. By processing actual interaction data that reflects real assets exchange between end-users it is possible to obtain an accurate picture of the overall business relationship between individual end-users, the overall business practices of specific end-users, and the impact those specific end-users may have had on the local community of users and the global economy as a whole. The data in the platform could be used to generate ground truth derived content accessible from the Internet that reflects a faithful image of businesses and their relationship with customers based exclusively on real interactions. The content from the platform can become a powerful tool in assisting users with business decisions as an alternative to commonly used crowd-sourced review platforms where authenticity of the information is not always verified. The commercial data platform can therefore shield users from the hazards of inauthentic reviews, review gating, and actions that are generally in noncompliance with the guidelines of the Consumer Review Fairness Act through which untruthful and even deceitful content can be made available to users.

Content created based on data mined from the commercial data platform of the present invention, and further processed with artificial intelligence and machine learning can be used for businesses to keep customers aware of their status over the overall economy environment. Interaction data as harvested by the commercial data platform of the present invention can be placed in context to provide information about customer and vendor segmentation, frequency and quantity of transacted goods and services, value in absolute dollars, designated value class for the business or the customers, number of repeat customers a store or other business has, score for how well the spending habits of customers keep funds within the local economy, a rank for the relationship of a particular user, etc., all based on verified real time values and interactions. All that information mined from data in the platform can be used to create dynamic and customized web content, which will provide small businesses with an easy alternative to publish their content and to share their business and relationships values.

The data mined, and further processed with artificial intelligence and machine learning, from usage of the simultaneous voice and data content driven commercial data platform can also be used to rank or badge users of the platform in ways that incentivize actions that increase usage of the platform and that otherwise align with the general ethos of the platform and platform administrators. As one example, users that are more active on the commercial data platform can receive specific badges which are displayed in association with the user on the commercial data platform, or they can be ranked higher in response to search queries. By rewarding usage of the platform with more visibility on the platform a virtuous cycle is created to incentivize still further engagement. Additionally, and as mentioned above, the data produced by the commercial data platform can provide better ground truth information for such ranking and badging systems because, unlike customer review-based ranking and review systems, the data on which the ranking and badging is based is difficult to spoof. The actual exchange of monetary value to a specific user through the commercial platform and number of inbound calls to the specific user is a valuable metric that is difficult to fake. Furthermore, due to the fact that the commercial data platform works to facilitate commerce for individual users in their dual roles as producers and consumers, it is possible to track and reward users with badges or preferential ranks based on how likely they are to keep content and monetary value within either the platform as a whole, or within specific ecosystems thereof. In this manner, and as will be described below, the ranking and badging can be relationship-centric in the sense that a rank afforded to a first user may be specific to their relationship with a second user of the platform.

More specific examples of these benefits and how the mined data can be utilized are provided in the detailed description below.

BRIEF DESCRIPTION OF FIGURES

FIG. 2 provides data tables that can be instantiated by a database for a data model of a commercial data platform in accordance with specific embodiments of the present invention. The tables shown are non-limiting and for illustrative purposes.

DETAILED DESCRIPTION

The following is a detailed description of systems and methods for facilitating simultaneous voice and data content driven commercial data platforms, followed by a description of the various functionalities that are enabled by such simultaneous voice and data content driven commercial data platforms. These examples are non-limiting and are provided for illustrative purposes. For example, numerous examples in this description are limited to cases where both parties to a conversation are utilizing smartphones or other mobile devices, but the platforms described herein function regardless of what kinds of devices are being used to access them. Furthermore, numerous examples in this description are limited to cases where two parties are using the platform in combination with a data channel as well as a voice channel. However, the approaches disclosed herein provide certain beneficial functions regardless of whether only one party is connected to the platform via a data channel or the voice channel. For example, one party could only have access to a voice channel and indirectly provide data to the platform via the other user's device. As another example, one party might not be connected via a voice channel and might only be accessible via the data channel. Specifically, a vendor may set up an IVR system to handle all incoming traffic calls by routing the device to the data channel without ever establishing a voice channel.

Figure 1:
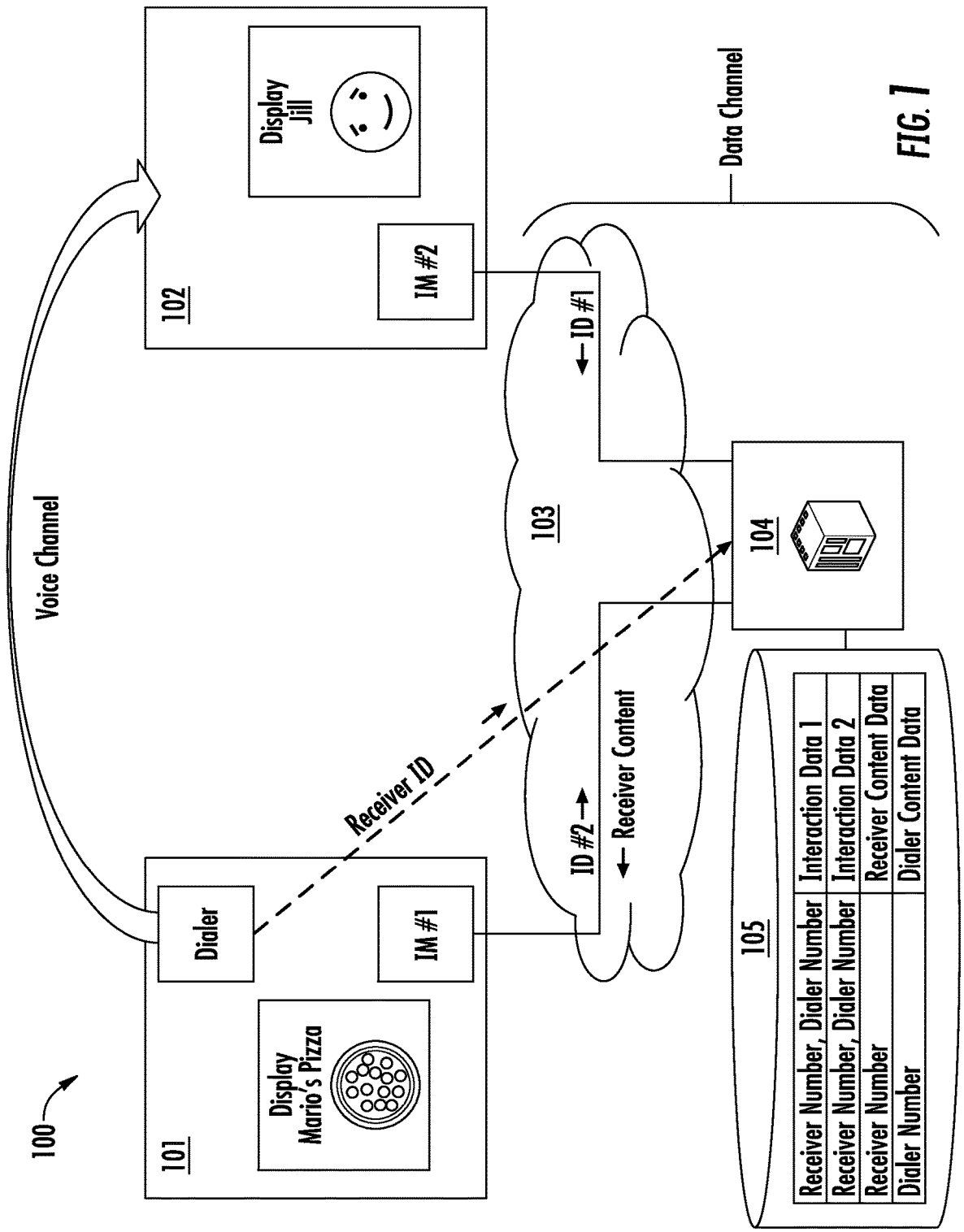
FIG. 1 illustrates a commercial data platform system for a call between a dialer device and a receiver device to facilitate a simultaneous transfer of voice and data content in accordance with specific embodiments of the present invention.

FIG. 1 illustrates a system 100 that can be used to facilitate a simultaneous voice and data content driven commercial data platform. The system 100 is based around a dialer device 101 and a receiver device 102. In certain approaches, the dialer device 101 and receiver device 102 will be connected via both a voice channel and a data channel. The voice channel can be a standard voice call connected between the two devices and facilitated by a circuit-switched network. However, any voice connection between the two devices can be utilized such as an IP phone connection facilitated by a packet-switched network 103. The packet-switched network 103 can utilize VoIP or other protocols. The data channel can be a packet-switched network 103 and can include a server 104 and a database 105 administrated by the platform. The network could include the Internet. The dialer and receiver devices can be any devices capable of supporting a voice call. Although the simultaneous voice and data content driven commercial data platform can function with users that are using separate devices for accessing the voice and data channels, in the system illustrated by FIG. 1, both users are using devices that can access both. For example, the devices may be smartphones that are able to support a voice based telephone call while also accessing the platform via a data connection such as via the Internet. The data channel could be accessed by an interface presented on a touch screen of the smartphones that are displayed during the call. The data channel interface could be shown alongside a dialer application and be provided by a separate application, or the dialer application could include an integrated window for the data channel interface. The data channel interface could be a screen overwrite, or screen overlay, inside, as part of, or on the dialer application screen normally unused and unchanging during the call duration, for the data channel interface. The devices could also be personal computers, wearables, standard telephones, or platform specific terminals. The users in the illustrated situation are a consumer by the name of Jill Smith and a vendor by the name of Mario's Pizza. However, the platform can also be used to facilitate peer-to-peer and business-to-business communication. As will be apparent from many of the examples provided below, users can also utilize the commercial data platform as both consumers and producers such as by both spending and receiving money and buying and selling goods and services.

The dialer device includes a dialer that is programmed to initiate a call between the dialer and the receiver device using a receiver phone number and/or other unique identifier. The dialer device can receive commands from a user using a traditional keyboard, auditory inputs such as voice via a microphone, touch inputs via a touch screen, gestures detected by an optical or non-visible light sensor, and any other means for providing user input. The dialer can be an application on a smartphone or a computer. The application could be the built-in dialer of a computing device, such as a smartphone, as developed by the developer of the operating system on the computing device. Alternatively, the application could be developed by the platform and include multiple functionalities in addition to serving as a phone dialer for establishing a phone call such as providing access to the data channel described herein. Alternatively, the application could be integrated with a third-party application such as a social networking application configured to allow the formulation of a voice channel between two parties using a receiver phone number and/or other unique identifier associated with one of those parties. The dialer can receive the receiver phone number and/or other unique identifier via a voice command, the selection of a hyperlink, the manual entry of a phone number and/or other unique identifier, scanning a QR code, or any other method for providing numbers to an application. The dialer can also be an application on a traditional electronic telephone that has been augmented for use with the platform. The dialer application can set up a voice call via a traditional circuit-switched network or via a packet-switched network such as via voice over Internet Protocol (VoIP). In any of these situations, and regardless of how the dialer initiates the call between the dialer and the receiver device, the receiver phone number and/or other unique identifier will be intercepted for use by the platform. Various approaches for intercepting the receiver phone number and/or other unique identifier are described in more detail below.

The commercial data platform also includes a server and a database. As illustrated, in FIG. 1, the server and the database can be connected to the dialer device and the receiver device through a network. The network can be a packet-switched network. The network can be the Internet. A data channel between the receiver device and dialer device can be supported by software on the receiver device and dialer device, the network, the server, and the database. The data channel can be supported by a first interaction manager (IM) stored on the dialer device and a second interaction manager (IM) stored on the receiver device. The interaction manager on the dialer device can be programmed to transmit a first set of interaction data (ID) to the database during the call. The interaction manager on the receiver device can be programmed to transmit a second set of interaction data (ID) to the database during the call. In specific embodiments of the invention, the data channel can include the first interaction manager, the second interaction manager, and the server. The interaction data collected during the call can be sent to the server using the data channel for storage in the database.

In approaches in which the devices include applications developed and provided by the platform, the interaction managers could be included in those applications. In the specific case of a smartphone with an application provided by the platform, the interaction managers could be part of the same application as the dialer on the dialer device.

The server and database can be part of a cloud-based platform. The server can be any system of software and suitable computer hardware that is capable of responding to requests across a network to provide a network service. Although the server is illustrated as a single unit of physical hardware, the server may comprise multiple physical hardware units. The physical hardware units can include personal computers, workstation, and dedicated enterprise server blades. The physical hardware units can be in a single physical location such as an office or data center, but they may also be located at separate data centers or offices. The server can be a virtualized server. Individual network services can be provided by individual servers or multiple servers, as well as individual units of physical hardware or multiple units of physical hardware. As the term server is used to describe a system that provides multiple network services in certain portions of this disclosure, it is implied that the multiple network services are not necessarily being supplied by a single unit of physical hardware. The database can be a proprietary database and have a data model that is in accordance with the detailed description below. This data model is exemplary, and more complex data models can be used with hundreds of tables with different keys to access the data. The database can be a relational or non-relational (e.g., NoSQL) database or any other database technology supporting high-speed real-time inserts, updates, and reads.

The data model of the commercial data platform can include multiple data tables instantiated by the database. The tables can include a user identity table, a user relationship table, a content table, an interaction type table, and an interaction fact table. FIG. 2 provides an example data model for a commercial data platform that includes tables 201, 202, 203, 204, and 205. As seen, the tables can be interrelated to provide a complete record of all interactions occurring using the commercial data platform which can later be accessed and mined, and further processed with artificial intelligence, machine learning and deep learning, to provide both consumers and vendors with rich data to enhance their later interactions. As illustrated, interaction data between a receiver and a dialer can be stored in association with both a dialer and receiver phone number or other unique identifier. Furthermore, it should be noted that the devices in the commercial data platform will have access to third party databases such as social media databases either directly or via the database of the commercial data platform as the IM on either device will be able to request the platform to obtain information from alternative databases which would then be stored in the platform's content table. Alternatively or in combination, the platform could be configured to request content from third party databases and dynamically generate responses when the requested content from an IM is not located in the database.

The database of the commercial data platform can include receiver content, dialer content, and interaction data. This data can be accessed in numerous ways to facilitate rich interactions between a dialer and receiver that are using the platform. As illustrated in FIG. 1, once a receiver phone number or other unique identifier is sent from the dialer to the server, the server can use the receiver phone number or other unique identifier to obtain receiver content data from the database and deliver it back to the dialer device. The receiver content data can include a profile from the receiver. For example, the profile could be a company storefront with static or animated images and videos with sound advertising the vendor's offerings. The storefront could include a company name and a profile image. Alternatively, the receiver content data could include links to a set of interaction data in the database to allow the dialer to begin interacting with the receiver using the platform before the call is set up between the two devices. The receiver number can be provided to the server in any number of ways as will be described in more detail below. Once the call is established, dialer content data could be delivered to the receiver device. The dialer content data could likewise be a profile for the dialer. The profile could be a dialer profile with a user name and a profile image. Both the dialer content data and the receiver content data could be pulled directly from the database of the platform or it could be dynamically generated by the platform via access to other information sources using the internet such as through a third-party API using either the receiver or dialer phone numbers and/or other unique identifiers. For example, if a receiver did not yet have a profile, the phone number of the receiver could be used in an internet search to obtain a name of the business, a location, and a few images of the business to produce a profile for display on the dialer device. The server can be programmed to detect an absence of profile data in order to trigger this dynamic generation of a profile.

The profile data displayed to a counterparty during an interaction using the platform can be configurable and can be specific to that counterparty's identity. For example, a user can be given the option to select images and other information to present as part of their identity. The profile can be a storefront for the user. The capability to generate this profile can involve selecting options and entering information for a template or it can involve a more flexible tool for designing the content such as a drag and drop WYSIWYG interface. The user can also configure multiple profiles for display using the system and can set different rules for who those multiple profiles are displayed to, in the form of profile sections. The user could set a specific profile for commercial use and another profile for personal use. The user could set a specific profile for callers they have a history with and another profile for callers they do not have a history with. In order to determine which profile content should be delivered, the platform could utilize both the dialer's phone number and/or other unique identifier, and the receiver's phone number and/or other unique identifier. The level of customization could drop all the way down to the level of individual callers and their specific relationship and/or authentication/authorization levels. Customization at this level could be provided in an automatic fashion by the platform while allowing the users to customize the automatic storefronts even more. For example, the storefront provided by Mario's pizza to Jill Smith could be automatically set by the platform to display the last order Jill placed with Mario and the number of times that Jill has placed an order with Mario generally, but Jill could be given the option to display a customized picture to Mario when she gives him a call such as a picture she took the last time she visited his restaurant. As another example, the platform could keep track of a confidence level for each number a person could reach out to. The confidence level could continue to rise based on how much interaction had taken place using the platform between that user and the number, and whether or not those interactions were positive or not. Users could then set different profiles up to be displayed based on those confidence levels where, for example, personal information was held back from being displayed if a confidence level was too low. As another example, the displayed information shown on the profiles could also include an assigned valuation of the relationship with the counterparty to the call. The assigned valuation could be generated dynamically by the platform based on the accumulated data stored therein from prior interactions between the parties to the call. More specifically, and returning to the call between Jill and Mario, the data in the platform could be used to generate and display a grade of "A+" to Mario to remind him that Jill is a repeat customer that should be treated with extra care and attention.

The profile data described above could also be processed so that it is available as a web page to be surfaced to an external agent outside of the platform. Users profiles stored in the database could be adapted to a web readable format so that they are accessible from a web browser or a social media platform. In this way, small business such as Mario's Pizza can be advertised on the web and new customers can find it and become aware of the platform if they are still not a part of it. The server could behave as a Content Management System (CMS) for the profile data in order to make that data available to the Internet. Additionally, the server can provide profile data to third party applications using an API so that third party applications can interconnect their users with the data in the platform, obtain new customers based on the profiles in the platform, and bring new users to the platform.

Figure 3:
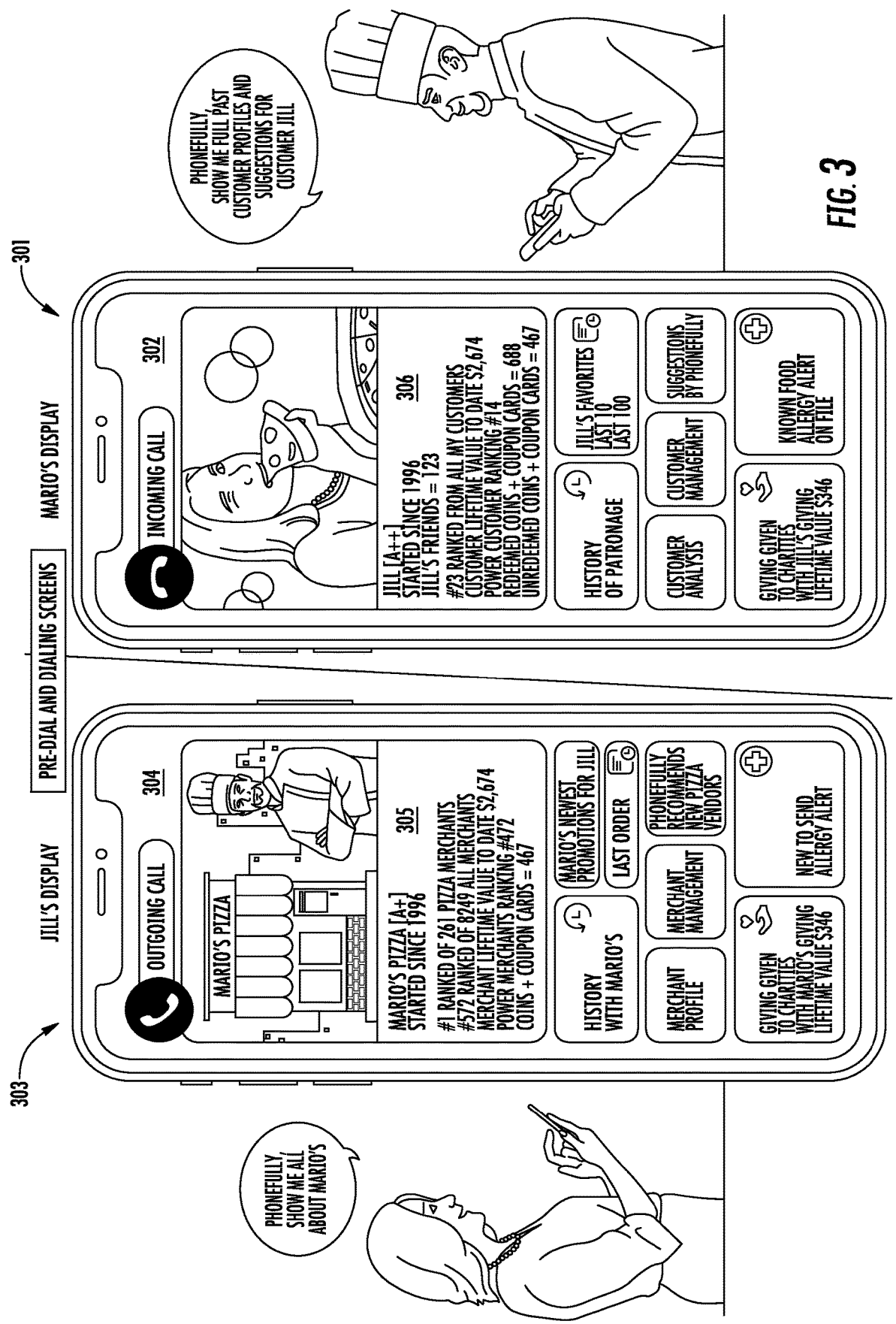
FIG. 3 illustrates a dialer device with a dialer display and a receiver device with a receiver display, displaying information before and during dialing, and after the devices have received content from a server in accordance with specific embodiments of the present invention.

FIG. 3 illustrates a specific example of a dialer device 303 with a dialer display 304 and a receiver device 301 with a receiver display 302 displaying information before and during dialing, and after the server 104 has delivered receiver content and dialer content to the respective devices as shown in FIG. 1. As seen, the profiles delivered to each of the devices are specific to both the receiver and the dialer. In this situation, the profiles delivered to each of the users, for example Mario's profile 305 and Jill's profile 306, have also been curated by either the platform or the individual users to reflect the relationship that has already been established between the users. This illustration also provides an example of how the commercial data platform can generate data for display using prior interaction data. In each of the displays 302 and 304, the counterparty has been assigned a ranking in terms of how often prior interactions have occurred to generate a label of "A+" which reminds the user of the value they should place on their relationship with the counterparty.

The manner in which interaction data is obtained for usage by the platform can also be described with reference to FIG. 1. Interaction data can be provided to and from the dialer and receiver devices to the server of the commercial data platform using interaction manager software stored on the device. The interaction manager will request information from the database and receive information from the database. It may also receive information from external databases that are accessed by the server. The interaction manager can receive data that is pushed from the database without a request being sent. As such, the software that facilitates interactions between the two devices along the data channel of the platform can be spread out amongst the server, the dialer device, and the receiver device. The first and second interaction managers can be programmed to transmit a first and second set of interaction data to the database during a call between the dialer device and the receiver device. The interaction data can be transmitted to the database through a data channel established between the interaction managers and the server, and the server could be responsible for receiving the interaction data from the interaction managers and store it in the database. The interaction data can be stored in the database for later use. The interaction data can be any data relating to the interaction between the dialer and the receiver during the call. For example, the second set of interaction data can involve a menu pushed from the receiver to the dialer through the data channel, and the first set of interaction data could include a selection of an item on that menu by the dialer. In these situations, the interaction data is being stored in the database and is also being passed through the platform from one device to the other to facilitate the current interaction between the devices such that the server and database are serving as part of the data channel between the two devices. For example, the interaction data sent from a vendor-receiver to a consumer-dialer could be a sales offer, while the interaction data sent back from the consumer-dialer to the vendor-receiver could be a purchase order generated in response to that offer. Any commercial interaction could be facilitated through this data channel via the transmission of various types of data. In keeping with the prior example, the interaction could continue with additional interaction data in the form of a receipt sent from vendor-receiver to the consumer-dialer. The data would be both channeled through the platform and stored by the platform for later use. The interaction data can also include information that is not provided from one device to the other such as payment information provided by the dialer device to the platform for forwarding to a payment processor. Even though the payment information is not provided to the receiver device it can still be referred to as interaction data herein because it relates to the interaction between the dialer and the receiver and it is ultimately provided to one of the devices.

The interaction data provided during the call can be a subset of the interaction data pushed by each of the devices to the server. The interaction data that is sent between the devices can facilitate a high-level of interaction between the receiver and the dialer. In certain approaches, the data channel of the commercial data platform will serve as a virtual table top to allow for the dialer and receiver to collaborate, and the interaction data sent during the call will be represented on this table top. The interaction data exchanged between the dialer and receiver is saved in a database and is, in turn, made available to enrich the current voice call as well as any future calls. Over time, a rich history of all past interactions is obtained and is readily available to both parties to further enrich the long-term relationship between the parties. The history of past interactions stored in the database can likewise be available for use externally to the platform. The server could be configured to provide interaction data to an external agent that is not necessarily involved in the communication between the dialer and the receiver. For example, the server may provide interaction data associated with a plurality of customers and a plurality of businesses to a recommendation search engine so that users are presented with real statistics of how many customers repeat their orders at a certain restaurant when compared with a similar one in the neighborhood, which is definitely an accurate indication of the acceptance of the restaurant in the area. This kind of ground truth and authentic data harvested by the system can provide superior recommendations that are based on reviews and "likes" that could be inauthentic or outright fake. In this way, users will be able to evaluate on their own the quality or reputation of the restaurant based on real interaction data rather than based on third user's reviews that have turned out to be misleading in many occasions.

Figure 4:
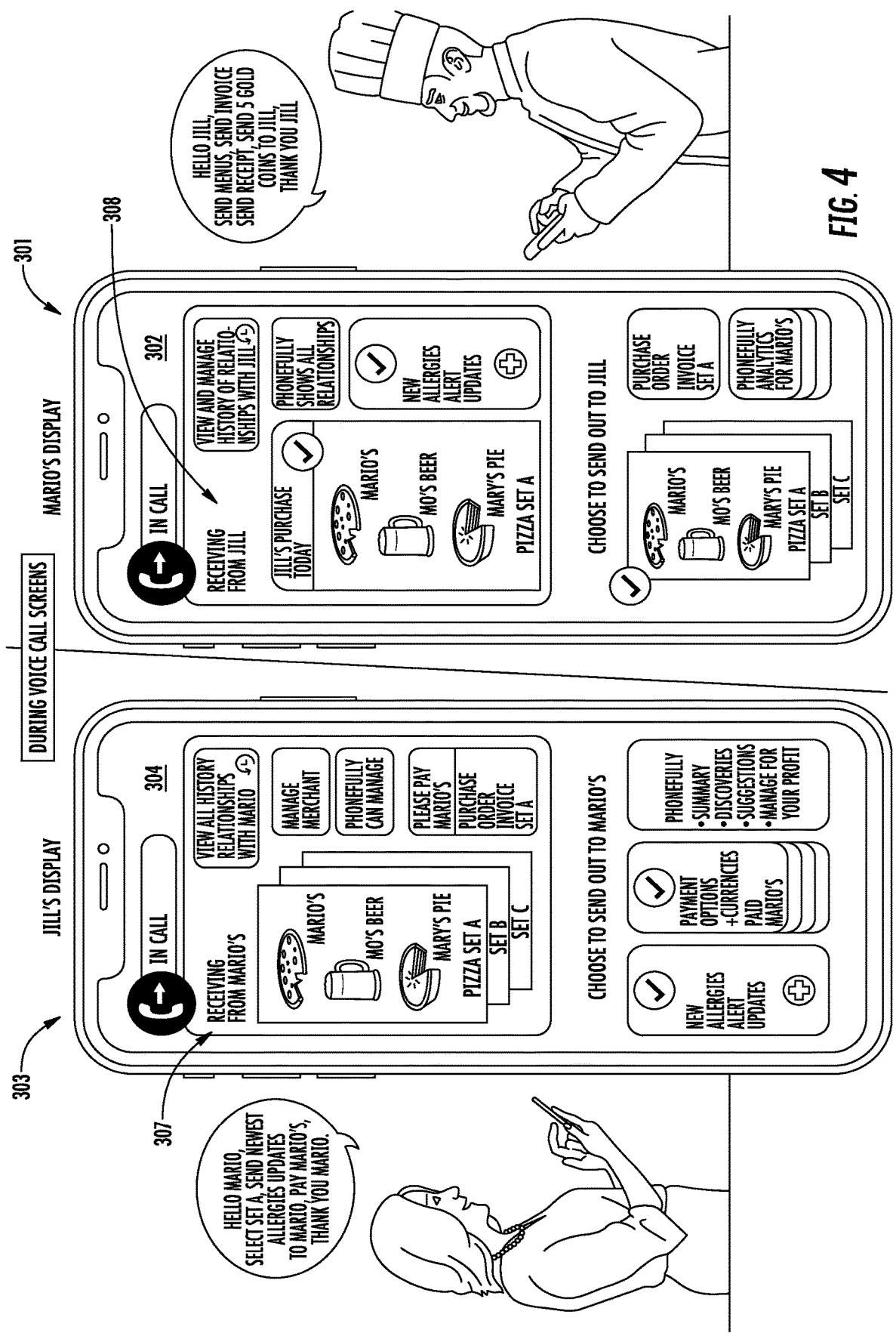
FIG. 4 illustrates the devices of FIG. 3 displaying information, during a voice call and after receiving new content from the server, in accordance with specific embodiments of the present invention.
Figure 5:
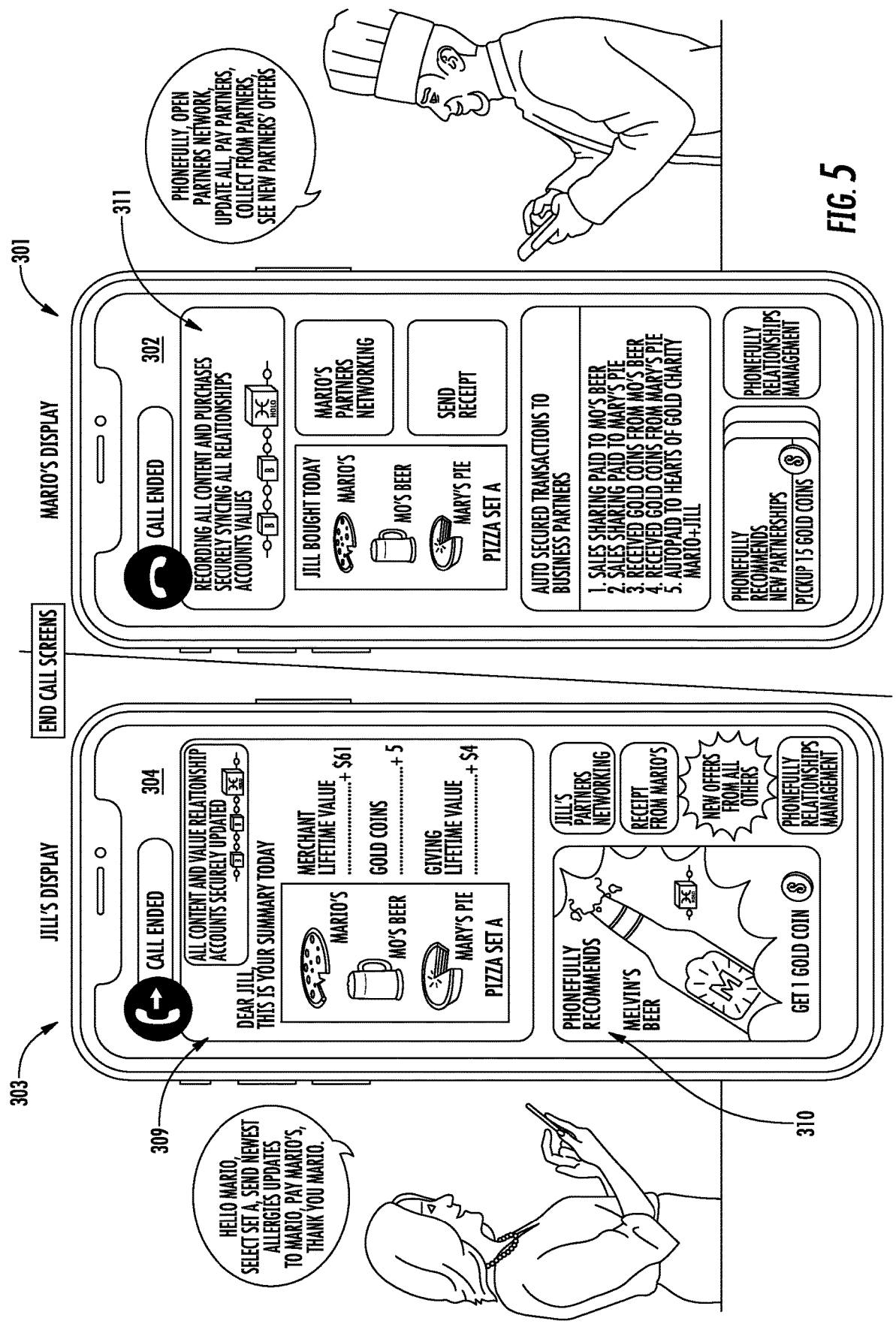
FIG. 5 illustrates the devices of FIG. 3 displaying information, during the end of a voice call and after receiving new content from the server, in accordance with specific embodiments of the present invention.

In the example of Jill and Mario, Mario could use the table to present coupons or deals to Jill in real time as Mario took Jill's order. Mario would also be able to pull information from the database concerning Jill such as the upcoming anniversary of a special event that she previously reserved a table for in order to offer her the opportunity to celebrate at Mario's again this year. Jill could also request additional information such as a picture of the inside of the restaurant's new exclusive private room for large parties, which Mario could provide in real time during their call. The data channel could also be used for Mario to provide Jill with a coupon for her next order at the conclusion of their call where an image of the coupon was provided to Jill's phone in the form of interaction data and stored in the database for later use by Jill the next time she called Mario. The data channel could also be used to provide platform wide incentives such as a specialized currency that can be used across all vendors that participate in the platform. As shown in FIG. 4, during a voice call and after receiving new content from the server 104, the display 304 on Jill's phone can show receiver device receiving information 307 which shows, for example, that Mario had prepared a food order to be received by Jill according to her preferences. The display 302 on Mario's phone can show dialer device receiving information 308 which shows, in the same example, that Jill confirmed her food purchase. As shown in FIG. 5, during the end of a voice call and after receiving new content from the server 104, the devices can show additional messages. Nonlimiting examples of such additional messages can be summary messages 309, recommendation messages 310, and data synchronization messages 311.

Figure 6:
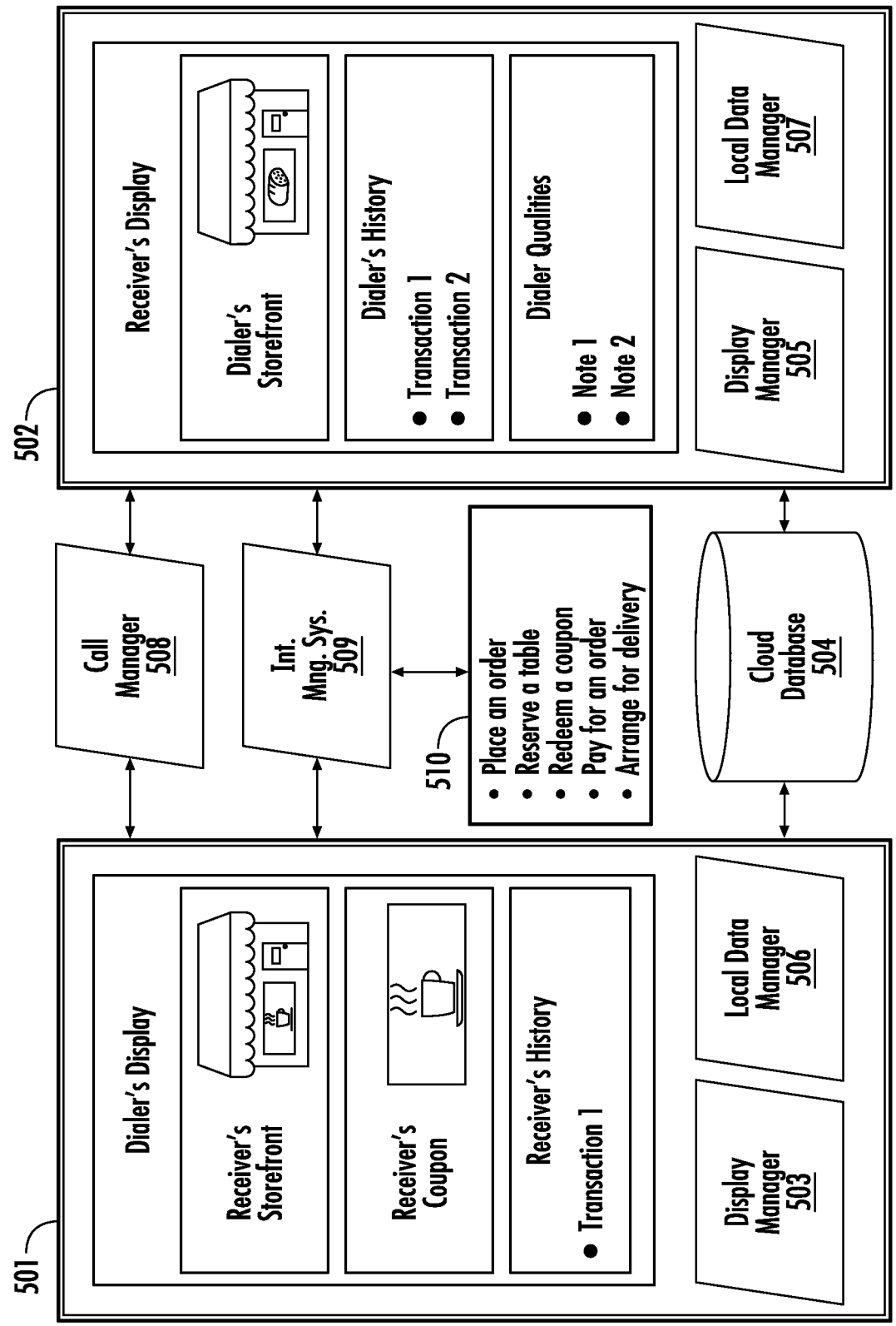
FIG. 6 provides a flow chart and block diagram for a method for use of the system of FIG. 1 in accordance with specific embodiments of the present invention.

As described in a system diagram provided by FIG. 6, the dialer device 501 with a dialer and the receiver device 502 could include additional software elements to help facilitate the functioning of the commercial data platform. For example, each device could include a display manager and a database. In one example shown in FIG. 6, the dialer device 501 can have a display manager 503 and be connected to a cloud database 504, and the receiver device 502 can have display manager 505 and be connected to the same cloud database 504. The display managers 503 and 505 could continuously receive content from all data sources in the platform and display content based on the configuration of the device owner's account with the platform. Display managers 503 and 505 perform local display management functions for the devices on which they are installed. A cloud database 504 can include the qualities and function of a local database, a platform database, and other database configurations that can be used with the commercial data platform. The display managers 503 and 505 could work in combination with the interaction manager to request data from the cloud database 504, and filter data delivered from the server before that data was presented on the device. For example, the interaction manager could indicate that a user was being provided with a set of gold coins, and the display manager 503 could select a particular image from the cloud database 504 that the user had selected to represent those coins. The display managers 503 and 505 could be programmed to generate display content for displays on the devices 501 and 502 using the interaction data from the cloud database 504. For example, the interaction data could include a sale offer generated by a receiver for delivery to the dialer device 501 through the database and server while the display content constituted an image used to make the sale offer visually appealing. The image could be stored in the cloud database 504 in association with the receiver's phone number and/or unique identifier. The display managers 503 and 505 could generally format content provided by the interaction manager for the displays on the respective devices 501 and 502. As such, the development effort associated with cross platform implementation could be lessened as the display managers 503 and 505 could be more heavily altered while the interaction manager stayed relatively stable with different implementations. The cloud database 504 could be managed by a local database manager locally installed on the system devices. For example, the dialer device 501 could have a local database manager 506 and the receiver device 502 could have a local database manager 507. Alternatively, system devices can have a local database element installed thereon, enabling local data storage on each device. Devices with a local database can operate independently or in concert with a cloud database 504 as part of a database network and can be managed by the local database managers of the respective devices, such as local database managers 506 and 507. The dialer device 501 local database manager 506 could be programmed to obtain data from interaction data regarding past interactions between a specific dialer and receiver whenever the dialer initiates a new call between the dialer device 501 and the receiver device 502. Past interactions stored in a database could include a transaction history of, or notes about, the communicating party, as shown on the example device displays illustrated in FIG. 6. The cloud database 504 could also be used to limit the amount of traffic on the network between the server and the dialer device 501 by storing data that was frequently accessed by the display manager 503 on a particular device. For example, if Jill was a regular customer of Mario's, then Mario's logo could be stored on Jill's device for retrieval every time her phone loaded Mario's profile. The local database manager could assure that certain dialer, receiver, or interaction content data persisted on the device between interactions for this purpose.

The user interface presented to the user could take on numerous forms. The user interface can display controls and information for the data and voice channels separately or simultaneously. The data channel interface could be shown alongside a dialer application and be provided by a separate application, or the dialer application could include an integrated window for the data channel interface. The data channel interface could be a screen overwrite, or screen overlay, inside, as part of, or on the dialer application screen normally unused and unchanging during the call duration, for the data channel interface. The dialer application screen could be the call screen of a built-in dialer application on the dialer device 501 and could display standard controls such as an end call button or a mute button. In the specific example of the data channel being administrated by a separate platform application that works in combination with a separate dialer, the platform application could present sufficient controls for handling both the data channel and the voice channel. For example, after intercepting the call, the voice channel would remain open, and the platform application would completely overlay the screen and display a user interface with the data channel where the interactive data content will appear without the need to switch to an outside additional application. Controls such as "mute" and "speaker phone" would now be available within the same user interface, and there would be no need to return to the original dialer application interface. If at any time during the call, the user would like to return to the original dialer application interface that initiated the call, the user could hit an icon on the user interface and return to the original dialer screen.

The devices used in combination with the platform could also include a real-time interaction manager and call manager 508. The call manager 508 could support continuation of a voice call, and the voice call itself, allowing the users to access the dialer and phone controls as needed. The call manager 508 could also support the voice channel independently of the data channel. The real-time interaction manager could continuously manage the interactions between a caller and receiver to make sure that all their interactions are logged in the cloud database 504. The real-time interaction manager could write and read data to and from the cloud database 504 and third-party external databases. The two components together could support the simultaneous use of multiple devices for the voice and data channel. The interaction manager could also manage and store all interaction threads 510 and activities during an ongoing communication over the data channel. The real-time interaction manager could include software stored on either device, including the interaction managers mentioned above, as well as software on the server of the platform. The interaction managers could manage at least two interaction threads 510 between the dialer device and the receiver device and would likely manage many more depending upon the level of interactivity provided over the data channel. Alternatively and with respect to the embodiments described above, the functions of the interaction manager and the real-time interaction manager can be implemented in the commercial data platform system by an interaction management system 509. The interaction management system 509 can be operated remotely using a cloud-based system and can be in communicative connection with both the dialer device 501 and the receiver device 502 to perform the interaction manager functions for both devices.

The software modules and components on the devices involved with the data channel that are described above, such as the display managers 503 and 505 and interaction manager, could be administrated by a single application or multiple applications. In addition, the dialer and call manager 508 that are involved with the voice channel could be administrated by a single application or multiple applications. Furthermore, the components associated with either channel could be administrated by a single application or multiple applications. In one approach, a single application provided by the platform administrator and stored on a device, such as a dialer's smartphone, could include an integrated dialer such that the application both initiated a phone call, alerted the platform to open the data channel, and administrated both channels during the call. The dialer, as a module of that application, could be programmed to receive the receiver phone number and/or other unique identifier prior to initiating the call and transmit the receiver phone number and/or other unique identifier to the server for purposes of obtaining receiver content for display to the dialer, and setting up the data channel. In another approach, two separate applications could be involved with dialing and communicating with the platform. The dialer could be a built-in dialer application on a smartphone operating system. The dialer could alternatively be a module in another third-party application installed on a smartphone or other computing device's operating system such as an integrated dialer in a social networking application. In a smartphone implementation, the separate application used to intercept the receiver phone number and/or unique identifier on behalf of the platform could be another application on the smartphone operating system with read phone state permission. The separate application could then receive a broadcast indicating that the dialer was initiating a call, obtain the receiver phone number from the broadcast, and transmit the receiver phone number and/or other unique identifier to the server. In either case, the application that is used to pass the receiver phone number and/or other unique identifier to the platform could be provided by the platform administrator through a network content distribution system such as an application store.

The applications could be installed and maintained on the user's devices. In one scenario, a potential user downloads the platform application to their mobile device and installs the application. At the same time the user could configure their mobile device to receive upgrades to the application over time. The user could then configure their platform application such as by setting their profile, customizing a storefront, configuring which profiles are shown to which users, and other options. The user can invite other users to join the platform by sending invitations out from within the application interface. The user can provide a command to send an invitation to specific people such as via the entry of their phone numbers in the application. The platform would then send out text messages to those users with a link to download the application.

Another way to invite users to join the platform is to simply call them. A user does not need to have the platform application installed to receive a call from a user who is. The receiver can receive a call in the same way that they always do, and can then be invited to join the platform while on the call. However, the application on the dialer device could receive a response from the platform that the receiver was not yet in the system. A user interface element could then be presented on the display of the dialer device, possibly alongside a temporary profile for the receiver that was generated dynamically, informing the dialer that they can invite the receiver. Upon selection of this user interface element, the platform could send a text message to the receiver device with a link to download the platform application. The dialer could be incentivized to invite the receiver through the use of incentives such as currency with the platform, coupons, or other incentives. The platform could customize the incentive and display it alongside the user interface element based on an identity of the receiver or dialer. To assure adoption, the dialer could be provided with an auditory queue over the phone to indicate that the receiver had indeed either received the text message, or installed the application on their device. The auditory queue could be provided over the voice channel to assure that both the dialer and receiver could hear when the receiver took steps to join the platform.

The commercial data platform can, as mentioned above, be made extensible via access to additional source of data such as third-party databases. Furthermore, the commercial data platform can be made extensible through the use of APIs used to interact with entirely separate platforms. In one particular example, the platform database can be used as a source of truth for an external incentives platform. The real-time interaction manager of the commercial data platform can be used to synchronize certain portions of the commercial data platforms database with an external database through the use of APIs. One type of synchronizing API can be distributed ledger technology. Distributed ledgers can comprise data sets that are stored and synchronized over multiple storage locations. Distributed ledgers and, equivalently, the data of which a distributed ledger is comprised, can be stored on a network of devices called a distributed ledger network. One example of distributed ledger data can be a set of ledger tables for an incentives platform where vendors and customers are able to exchange coins or cards for goods and services. Another example of distributed ledger data can be a first set of interaction data and a second set of interaction data that form a commercial transaction and are stored in association with the two parties to the transaction. For example, the first and second sets of interaction data can comprise a purchase order and an invoice. Interactions taking place on the commercial data platform can involve these external incentives platforms in the sense that data can be taken from those external platforms or pushed to those external platforms. In this situation, a customer is rewarded with an incentive from a seller for referring another customer to the seller. All of the many interactions associated with that set of transactions are facilitated and recorded by the commercial data platform and are used to update the external incentives platform. Therefore, through the use of APIs and the real-time interaction manager any number of external services can be added as services to the commercial data platform essentially mining the data from all of the interactions that occur on that platform into a single frictionless system that ensures full commercial trackability and traceability as to which vendor, merchant and referring customer added value to the chain of interactions to be compensated with agreed rewards payable for example in gold coins and accruable incentives.

One class of external databases that can be accessed by the commercial data platform are those associated with advertisers. The commercial data platform can interact with these external databases using the interaction data harvested by the platform in order to provide useful advertisements and offers to the participants of the platform. Since the interaction data will include information regarding the purchases, purchase decision processes and substitutes available during those decisions, as well as other areas of interest of the platform participants, a rich picture of the platform participant as a purchaser can be developed. This data can be kept isolated by the commercial data platform and used to request or authorize the entry of advertisements from external databases without allowing the advertisers access to the stored data to ensure user privacy. Given the rich amount of data available to profile a purchaser, and the fact that the purchaser is likely already engaged in commerce when using the system, the advertisers can pay strictly for sales originating from advertisements drawn into the platform. Alternatively, the external database can be accessed using ad criteria that has been supplied from the platform using attributes such as, for example, the type of business being called and or attributes about the dialer and/or receiver, and/or any other attributes that may be useful to serve an appropriate ad.

In a specific embodiment of the invention, a server in the system is programmed to obtain interaction data using a dialer identifier and a receiver identifier after a dialer has initiated a call with a receiver. The server is also programmed to analyze the set of interaction data and obtain external content from an external database based on the analyzing of the interaction data. A display manager stored on the dialer device can then generate, during the call, display content for a display of the dialer device using at least a portion of the external content. The external content can be advertising content and the analyzing of the interaction data can comprise determining a degree of interest in the advertising content based on the interaction data. Certain embodiments in accordance with this disclosure exhibit certain benefits in that the call screen of a standard call using a smartphone includes unused real estate that can now be put to use by providing interesting offers to a user. Furthermore, the interaction data associated with both the dialer and receiver is usefully harvested for determining a degree of intertest in advertising material because the particulars of the commercial situation that lead to the creation of that interaction data is highly likely to apply to the current call as well. For example, if the interaction data shows that a user is likely to purchase a specific soda when ordering a given type of food, advertisements for a promotion for a close substitute to that specific soda are likely to have a greater impact if delivered during the call because the purchaser is already considering their desire for that product. In this way, prior interaction data serves to create, not just a good profile of a purchaser's interests in general, but a highly tuned profile of that purchaser's interests in a situation that they currently find themselves in.

The Simultaneous Voice and Data Content Driven Commercial Data Platform will track, to the greatest level of detail possible, the comprehensive set of all interactions that occur between the numerous entities transacting business, including interactions between networks of entities and themselves or other entities, in a reliable, secure, and above all trusted manner. Supporting these transactions, and any incentives and rewards system, will require support for any number of currencies including traditional country specific currencies, a platform proprietary currency, and any accepted externally recognized cryptocurrencies. The Commercial Data Platform will facilitate these currencies' inter-convertibility, for example through a series of sequential debit and credit transactions using different currencies, and act as a currency exchange. Currencies usable with the Commercial Data Platform can include stored bank account funds backed by various national entities in the global banking system, cryptocurrency funds, and credit card funds. The ledger of transactions representing all transactions, regardless of currency, must be tamper-proof and, therefore, the Commercial Data Platform will make full use of the repertoire of any current or future mechanisms, systems, processes, and technologies to construct and insure ongoing trusted, secure, scalable, and protected Commercial data platform integrity comprising of, but not limited to, the use of technologies such as a Distributed Ledger Technology (DLT) like Blockchain and Holochain.

Through the use of the commercial data platform and techniques described above, a multitude of opportunities for enhanced consumer-to-consumer (C2C), business-to-consumer (B2C), and business-to-business (B2B) commercial relationships are created. The flow of data between parties both enriches the current interactions from which that data is being mined and future interactions between the parties as they build stronger ties and commercial relationships. To further this goal, the data can be mined and further processed with big data analytics, artificial intelligence, natural language processing (NLP) machine learning, deep learning and deep artificial neural networks. These benefits are described below in multiple scenarios to illustrate some of the rich content and interactivity that the commercial data platform provides. The scenarios can, at a top level, be broken down between two sets of scenarios. In one set of scenarios, the dialer interacts with the receiver using both the voice and data channels described above. In the other set of scenarios, the dialer interacts with the receiver using only the data channels. The scenarios are specific examples of the use of a system in accordance with this disclosure and are not meant to limit the scope of the appended claims. Phonefully is provided as an example of a simultaneous voice and data content driven commercial data platform, the Phonefully proprietary data store (PPDS) is provided as an example of the database of the simultaneous voice and data content driven commercial data platform, the Phonefully App is provided as an example of a platform application, the caller is provided as an example of a customer-dialer, and Mario is provided as an example of a vendor-receiver.

The data produced by the Simultaneous Voice and Data Content Driven Commercial Data Platforms disclosed herein and stored in the ledger of the platform will contain an intricate and detailed web of information concerning all of the commercial interactions of the various market actors within, or on the periphery of, the commercial data platform. In embodiments of the invention mentioned above in which a currency is made for usage outside the commercial data platform, but whose usage data is either traced in a distributed ledger or otherwise made available to the commercial data platform, any usage of the currency will likewise add to the level of information provided by this web. This data will be ripe for mining and synthesizing, such as with artificial intelligence, to provide all market actors with information regarding the broader impact of their commercial decisions on the overall market that lies within the web of information. The data will include not only what a customer purchased or a seller sold, but what other options the transaction participants considered when making their decisions, what incentives were sufficient to drive a purchasing decision, or even what amount of time a party took to reach a decision on spending. The data can also be combined with data accessed from external sources, as described above, including external economic market content. All this data can be synthesized, such as with artificial intelligence, into a more complete picture of the forces of supply and demand at work in the relevant market.

Adam Smith once said that the economy functions according to an "invisible hand" which guides the selfish acts of individual market actors towards the production of social benefit. However, the invisible hand and reliance on the selfish acts of individual market actors to provide social good was an unavoidable aspect of Adam Smith's vision— not a laudable feature. Today, there is no reason to keep the hand invisible when you have access to vast troves of data, analyzed and synthesized using big data techniques and artificial intelligence, that reveal the flow of commerce between all actors in an economy and their preferences, nor is there any reason to rely solely on the selfish acts of individual market actors when there is ample evidence that people do wish to make the world as a whole better with their choices even if they derive no material benefit from doing so. Both these improvements to the traditional operation of a market economy can be made through the use of the systems disclosed herein. As the CRMs we have described include massive amounts of data regarding all of the commercial transaction conducted by an individual, and also provide a liquid channel for feeding back a synthesized version of that data to individual market actors, those market actors can see the impact of their commercial decisions and be empowered to make choices that improve the economy and world as a whole.

In specific embodiments of the invention disclosed herein, the CRM is used as a system for the improvement of social good through intelligent informed interactive C2C, C2B, B2C, and B2B commerce. Various implementations of the CRM can provide these benefits in various ways including storing and analyzing the mass of interaction data using Blockchain technology to package the data in such a way that the chain of relationships and interactions is readily accessible and cryptographically encoded in each block of data utilized by the system, packaging and presenting the information to users in a manner that gamifies and incentivizes social betterment, as will be described immediately below, and providing the system with an embodied representative of the CRM itself in the form of an avatar that can encourage users to take actions that contribute to social welfare as opposed to their own direct personal benefit. With specific regard to Blockchain, and as described above, the CRM would benefit from employing and harnessing Blockchain to track, report on, and proactively present how a user's transactions and relationships choices through histories of relationships, exchanges, interactions, and transactions have affected the system as a whole, and the outside world, as opposed to just providing an account statement for the user and the parties the user has interacted with directly.

In addition to the benefits noted above of synthesizing all the individual exchanges and transactions of content and payments within the CRM and displaying that synthesized information to a user, a layer of gamification can be added to the system to encourage individual market actors to maximize the level of social good they are generating with their commercial decisions. Various scoring systems and metrics can be provided to allow an individual market actor to understand the potential impact of various choices available to them. Incentives can also be provided such as in the form of sweepstakes wins or the actual issuance of commercial data platform currency in exchange for points scored. The scores and metrics can have different objectives such as favoring contributions to a local economy vs. the broader economy, decreasing income inequality, decreasing environmental harm, etc. Users can also be provided with the ability to determine which metrics they want tracked or displayed when faced with a given commercial decision. The scores and metrics can be presented to the user with respect to various commercial decisions. For example, the scores and metrics can provide a score for dealing with a specific counterparty, making a particular purchasing or selling decision relative to another, or choosing to invest money instead of spending it. The information can therefore be utilized to determine, for example, if a market participant should transact with merchant A (a local coffee shop) instead of merchant B (a global chain of coffee shops) because of the impact transacting with merchant A will have on the local economy relative to transacting with merchant B. Furthermore, the information can be used to help determine what should be purchased from merchant A, and whether a purchase in any given case produces more harm than simply abstaining.

In specific embodiments, the CRM can take on a roll similar to a gamemaster within the game system provided by the CRM and interact directly with the players. The gamemaster can be instantiated by an avatar within the system and interact directly with the various users in the system to provide them with information or encourage them to take actions that provide beneficial externalities as compared to making decisions based solely on price and benefits that are derived directly by the user. The avatar can provide the scores and metrics mentioned in the previous paragraph through voice or visual communication with the user as provided by an interaction manager or a display manager on the user's device. The scores and metrics can be presented to a user to assist them with making a decision as well as in reviewing the cumulative effects of their prior usage of the system.

Figure 7:
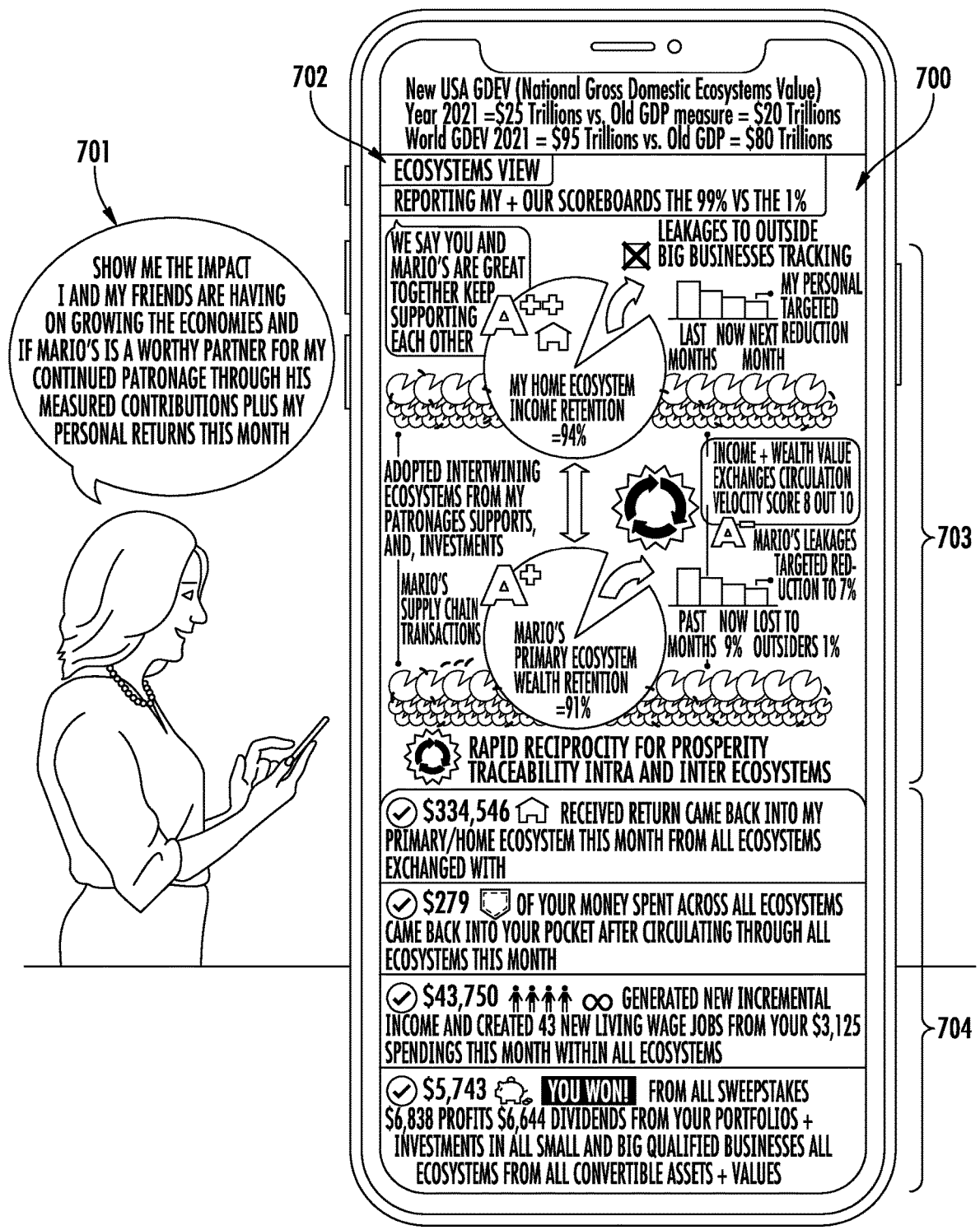
FIG. 7 illustrates the device of FIG. 3 displaying information that has been collected, aggregated, and synthesized by a commercial data platform to provide a user with visibility into the impact of their commercial decisions in accordance with specific embodiments of the present invention.

FIG. 7 illustrates the device of FIG. 3 displaying information that has been collected, aggregated, and synthesized by a commercial data platform to provide a user with visibility into the impact of their commercial decisions in accordance with specific embodiments of the present invention. In this case, display 700 has been set to display a specific metric in response to a voice command 701. In response to receiving this command, the CRM can analyze collected interaction data along with external content such as external market content and synthesize a score value for the desired metric. In the illustrated case, analyzing the interaction data can include determining a submarket ecosystem. The metric requested by the user in this case is an ecosystem impact metric which has produced ecosystems view 702. Ecosystems view 702 includes a metric presentation section 703. The metric presentation section 703 can include various metrics such as a submarket ecosystem performance indicator generated using external economic market content and interaction data stored by the CRM. Notably, the voice command 701 also includes a decision space in which to analyze the metric, because the user is interested in seeing the impact of selecting Mario as a commercial counterparty. As illustrated, Mario is a good counterparty to select for the ecosystem metric as Mario, and the people Mario enters into transactions with, etc. tend to utilize their money in a way that benefits the users home ecosystem. Display 700 also includes a notification section 704 which provides specific additional notifications regarding the currently displayed metric, progress regarding the gamified aspects of the CRM generally, and may also include, as illustrated, notifications regarding other metrics in a bid to entice the user to consider those also. As illustrated, the user is presented with a notification regarding the number of living wage jobs created by the commercial decisions made using the CRM, which might become a metric the user begins to track and consider when making future decisions.

In a specific embodiment of the invention, profile and interaction data as harvested by the commercial data platform, or derivatives thereof, can be made available externally.

The commercial data platform of the present invention, described in detail with reference to FIG. 1, allows for the storage of valuable interaction data in association with the multiple users of the platform. As explained before, the history of previous interactions can be used by the platform to provide a personalized experience for users who are connected through a voice call and are able to receive rich content that has been customized based on data of their previous interactions through the platform. However, significant information derived from the interaction data stored in the database could be made available to users or entities outside of the platform that may benefit from such information.

Considering an increasing number of users of the platform and the commensurate number of interactions between them, a large amount of interaction data will be stored in the database. Such interaction data will be useful not only for enriching the communication between two users communicating through the platform but also for characterizing businesses and customers based on their overall behavior as described by the interaction data associated with them. For example, the history of all interactions of the different customers at Mario's Pizza may indicate that a commonly repeated order among the customers is Mario Special Pepperoni Pizza, and that customers who order vegies pizza change to a different toping for their next order 99% of the time. This information may help a new customer at Mario's Pizza to decide what to order, by indicating that Special Pepperoni Pizza is preferred among the customers.

Nowadays, users obtain such kind of information mainly from crowd-sourced review platforms. Information from users' reviews can be practical and useful as long as it can be shown to be honest and genuine. However, polemical scenarios have turned out from the use of reviews-based platforms that have shown to be unfair and non-reliable. It is difficult to confirm the authenticity of a review provider. In the Mario's Pizza example before, Mario could ask his family and friends to support him by writing a nice review or giving five stars to his veggie's pizza, which they will probably do even if they believe such pizza toping is not good. Users reading such positives reviews may incorrectly conclude that veggie's pizza is a good choice. This situation is not likely to happen if users base their choices on actual interaction data that shows what the favorite pizza really is, based on the actual repeat orders as recorded by the platform. In the same way, if Jill's interactions with 15 different restaurants show that she is an A++ customer for all of them, it may alert a new restaurant where Jill is ordering for the first time that she is a potential valuable customer that should be treated with the level of respect owed to such a customer.

Based on the above examples, the intrinsic value of the interaction data stored over time by the commercial data platform of the present invention is clearly evidenced, and the ability to make the interaction data or derivatives thereof available outside of the platform becomes a desirable commercial asset. Interaction data or derivatives thereof can be surfaced to external agents, such as for example, a web browser, an external application proprietarily programmed to interoperate with the server, a third-party external application, an intelligent searching agent, a recommendation engine, or any other external agent that may benefit from such data.

When an independent user (not using the commercial data platform of the present invention) is in need of information about a certain business and uses a web browser or other external agent, such as the ones mentioned before, to obtain the required information, the external agents can communicate with a server of the commercial data platform of the present invention to obtain interaction data associated with the business the user is interested in or derivatives thereof. Such data could be surfaced to the end user as a result of their search in a customized manner and depending on a plurality of parameters, as will be explained below.

The data collected and surfaced can be interaction data or derivatives thereof, or profile data as cored by the platform. As explained before, interaction data can be any data relating to the interaction between dialers and receivers during a call. Derivatives of the interaction data, in turn, can be any data derived from such interaction data. For example, in a case where the receiver device is associated with a business profile on the server, the interaction data or derivatives thereof can include a number of incidences of repeat business conducted with the business profile using the system, a local economy impact score associated with the business profile, a rank of a business relationship associated with the business profile, etc. The interaction data or derivative thereof can be surfaced to rank business profiles relative to other business profiles on the server.

Derivatives of the interaction data can be collected directly from the database or generated dynamically by the server. Derivatives of the interaction data include any piece of data, factor, parameter, rating, statistic or general information that may be derived from "raw" interaction data as originally stored during voice calls. For example, the interaction data may consist of individual transactions performed by different customer at a certain business, and a derivative thereof can be a characterization or grade for the business as a whole based on the number of transactions or amount of money that users spend on them. As another example, interaction data may consist of the amount of money spent by a certain customer throughout a plurality of businesses, and a derivative thereof can be a grade for the customer based on the amount of money spent, for example, an A++ grade which is derived from a large amount of money spent. Another example of a derivative is the local economy benefit score, overall users' preferences, customer and business segmentation information, among others.

In specific embodiments of the invention, a server in the system, such as server 104 of FIG. 1, is programmed to collect a collection of interaction data or derivatives thereof from a database, such as database 105 of FIG. 1, and surface the collection of interaction data or derivatives thereof to an external agent.

The server can collect data from the database by using a data collection logic. A data collector application or any software for managing databases could be provided as part of the server for that purpose. The server can include a Database Management System (DBMS) or any software for managing databases for selecting the demanded data from the database. A query language, such as Structured Query Language (SQL), can be used to query the database.

As explained with reference to FIG. 1, data in database 105 can be stored in association with receiver and dialers identifiers. In this way, retrieval of the desired data can be performed by providing an identifier of the dialer or receiver for which information is required. The server can be programed to collect content data individually associated with a dialer or receiver identifier, such as a stored profile or storefront. The server can also be programed to collect interaction data associated with both a receiver and a dialer identifier. The server can also be programed to collect interaction data using either the receiver or the dialer identifier.

In specific embodiments of the invention in which the server is programmed to collect interaction data based on both the receiver and the dialer identifier, as explained with reference to FIG. 1, the resulting collection of interaction data will be exclusively related to the interaction between the particular receiver associated with the receiver identifier and the particular dialer associated with the dialer identifier. However, in specific embodiments in which the server is programmed to collect interaction data based only on one identifier, either the receiver or the dialer identifier, the server will most likely collect interaction data for more than one interaction and related to more than one interacting parties, because the database stores interaction data for a plurality of users that may be interrelated, such as a plurality of customers of a same restaurant. For example, if the server is collecting interaction data based only on a receiver identifier, the server can obtain from the database a plurality of interaction data sets associated with that receiver identifier and a plurality of different dialer identifiers. Referring back to the example of Jill and Mario, if the server uses both dialer (Jill) and receiver (Mario) identifiers for collecting interaction data, the resulting collection will be the interaction history between Jill and Mario. However, if the server uses exclusively Mario's identifier to search the database, all information indexed to Mario's identifier can be collected, and the resulting collected interaction data can include interaction data between Mario and all of his customers, including but not limited to previous interactions with Jill.

In the specific embodiments in which the server collects interaction data based on a single identifier, such as a receiver identifier, the server can be programmed to search the database and collect data associated with the particular identifier. For example, the server can be programmed to collect interaction data based on a receiver identifier by searching the database and aggregating all data indexed to the receiver identifier to a data structure for further processing.

Once the server has collected the data from the database, the collection of interaction data or derivatives thereof can be surfaced to an external agent in numerous ways. The collected data can be directly provided to the external agent. For example, the collected data can be provided in a data structure generated by the server through an external data channel between the server and the external agent. As another example, the collected data can be provided in a web readable format so that it can be directly displayed in a web-based platform by the external agent.

The collected data can be used by the server to generate a receiver page, such as a customized web page, to be surfaced to the external agent. Although the example of a receiver page is used herein as an example, the page can be for any user of the system and users can, at different times, be both receivers and dialers.

The receiver page can be generated by the server using a Content Management System (CMS). The CMS can be an application running directly on the server or accessed externally. The CMS can allow the generation and formatting of content (e.g., web content in the form of HTML and Javascript) based on the information that the server provides. In this way, a receiver page can be created and surfaced so that the content can be seen from external agent platforms (e.g., web browsers or proprietary applications). The CMS can populate the receiver page using the collection of interaction data or derivatives thereof from the database and produce a populated receiver page. The CMS can also populate the receiver page using receiver profile selections, so that only information that the receiver selects or authorizes is surfaced to the external agents. In specific embodiments of the invention, the receiver can create a layout of the page to be populated using the CMS, and the server will provide the collection of interaction data or derivatives thereof to the CMS as the content to be used to populate the receiver page. The populated receiver page can be surfaced to the external agents directly from the CMS.

The receiver page can be generated by the server, that can be programmed to dynamically generate HTML, JavaScript, PHP, or CSS code for dynamic generation of a web page from a structure in a database.

In specific embodiments of the invention, the external agent can use an API to request and obtain data directly from the server. In these embodiments, the external agent will have more flexibility for customizing the data and show the data embedded in their platforms or websites. By using an API, the external agents will be able to request and then display data from the server directly.

In specific embodiments of the invention, the server can be accessible over the Internet. For example, a static public IP address can be assigned to the server so that users can access it. In these embodiments, content generated by the server, such as receiver pages, will be available to the public and external agents such as search engines can find it. The server will then operate as a host for the receiver pages that can be accessed using the receiver identifier. The host server can be a different server than the server that stores and processes the interaction data for the users of the commercial data platform, to ensure the safety of the data processed by the commercial data platform. In embodiments in which the server dynamically generates web content, such web content can be submitted to search engines to be retrieved by the search engine's algorithm and displayed among the Search Engine Results Page (SERP) in response to a related user query.

In specific embodiments of the invention, the server can receive a receiver identifier from the external agent. A receiver, as used herewith, refers to the entity for which information is going to be sent to the external agent, such as a particular business. The server can receive from the external agent the exact receiver identifier to be used to collect information from the database, such as the receiver phone number, or a list of receiver identifiers that the external agent is interested in. In specific embodiments of the invention, the server does not receive a receiver identifier from the external agent, and directly surfaces content to the external agent at the server discretion. For example, the server can be programed to surface all profile content in the database in a web readable format so that users of the external agents can access it.

In specific embodiment of the invention, the server allows for a user-customizable externalization of the information. The server can receive receiver profile selections and limit the collection and surfacing to the external agents based on the receiver profile selections. The receiver profile selections are customizations that the receiver can provide for their profile. The receiver can decide what part of the interaction data stored in the database can be surfaced to external agents and how it is going to be surfaced. For example, the receiver may have an agreement on data privacy with customers, and only part of the interaction data stored in the database during the calls is allowed to be surfaced externally to the platform. In that case, the receiver can provide profile selections to the server and the server can collect and surface interaction data included in those selections, and the profile selections may act as a filter for the complete collection of interaction data associated with the receiver. In specific embodiments of the invention, the receiver profile selections can be static templates with standard information about the receiver, that will be dynamically enriched with the interaction data collected by the server.

In specific embodiments of the invention, the server can be programmed to receive an identifier of an external user interacting with the external agent. For example, the server can receive the phone number of the user. As another example, the server can receive an external user identifier such as an IP address, external username, or OAuth credential, that has been stored by the server and associated with an identifier of a user of the system. If the server determines that the external user identifier is associated with a profile in the commercial data platform, such as a dialer profile, the receiver page can be populated based on the user profile. Although the example of a dialer profile is used herein as an example, the profile can be for any user of the system and users can, at different times, be both receivers and dialers. The receiver page can be populated based on both the receiver profile selections and the external user profile. In this way, a customized page can be delivered to the external user that takes into consideration the preferences from both the external user and the receiver, or the preferences of the receiver with respect to that external user.

Figure 8:
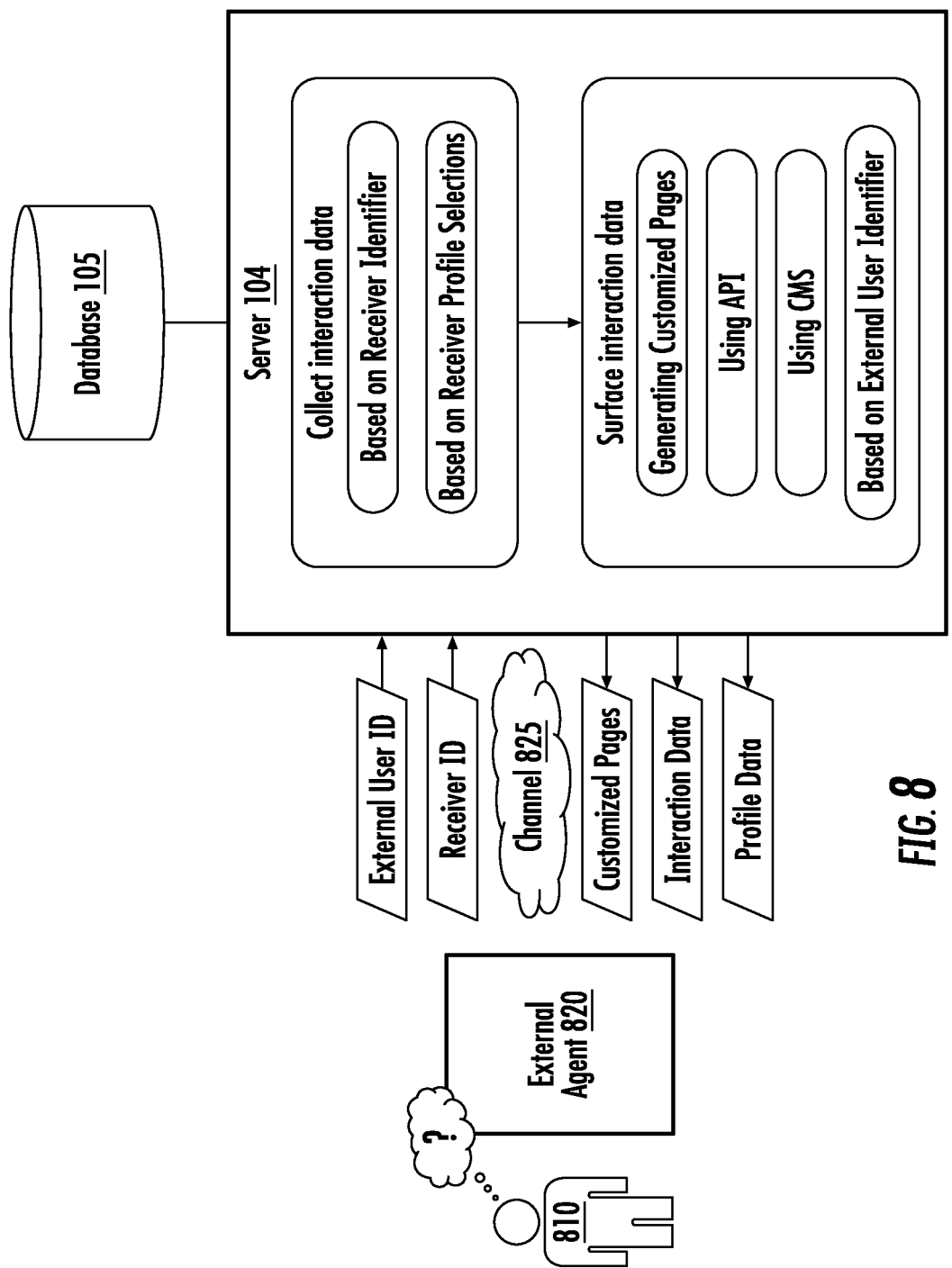
FIG. 8 illustrates a scenario in which a server is in communicative connection with a database and an external agent to collect interaction data or derivatives thereof from the database and surface it to the external agent in accordance with specific embodiments of the present invention.

FIG. 8 illustrates a scenario including a server, such as server 104 of FIG. 1 that can access a database, such as database 105 of FIG. 1, and can communicate with an external agent 820 through channel 825. Profiles and interaction data associated with multiple dialers and receiver's identifier are stored in the database 105 as a result of the process described with reference to FIG. 1. In this scenario, server 104 can be programed to collect interaction data or derivatives thereof from the database 105 and surface it to the external agent 820 in the manners explained before.

The external agent 820 can be interconnected with server 104 through communication channel 825. Communication channel 825 can be a wired or wireless communication channel. Communication channel 825 can be a regular data channel between the server 104 and the external agent 820. Communication channel 825 can be an API that allows the external agent to access content from the server.

In the example of FIG. 8, an external user 810 is interacting with the external agent 820. For example, user 810 may be using a web browser to find good restaurants in the neighborhood. The external agent 820 can provide the server 104 with a receiver identifier, for example, a phone number of a restaurant that the user 810 has shown interest in. The external agent 820 can also provide the server 104 with the external user identifier, for example, a phone number of the user 810 interacting with the external agent 820.

Server 104 proceeds to collect interaction data or derivatives thereof from database 105 in association with the receiver identifier. Server 104 can determine if the receiver associated with the receiver identifier has provided receiver profile selections, and if so, limit the collection of interaction data to the receiver profile selections.

After the interaction data or derivatives thereof have been collected from the database, server 104 proceeds to surface the collection to the external agent. In order to surface the collection of data, the server places the collected data in a format suitable for the external agent to process it. For example, the server 104 can generate customized receiver pages to be sent to the external agent, that can be in a web readable format. The server can use a CMS to prepare content for visualization for the external agent. The server can use an API to provide data to the external agent that can be embedded in the external agent application.

If the server 104 determines that the external user identifier received from the external agent 820 is associated with a profile stored in the database, which means that the external user 810 is also a user of the commercial data platform of the preset invention, or is otherwise associated with the platform, the data to be surfaced to the external agent 820 can be further customized based on the information on the profile.

Figure 9:
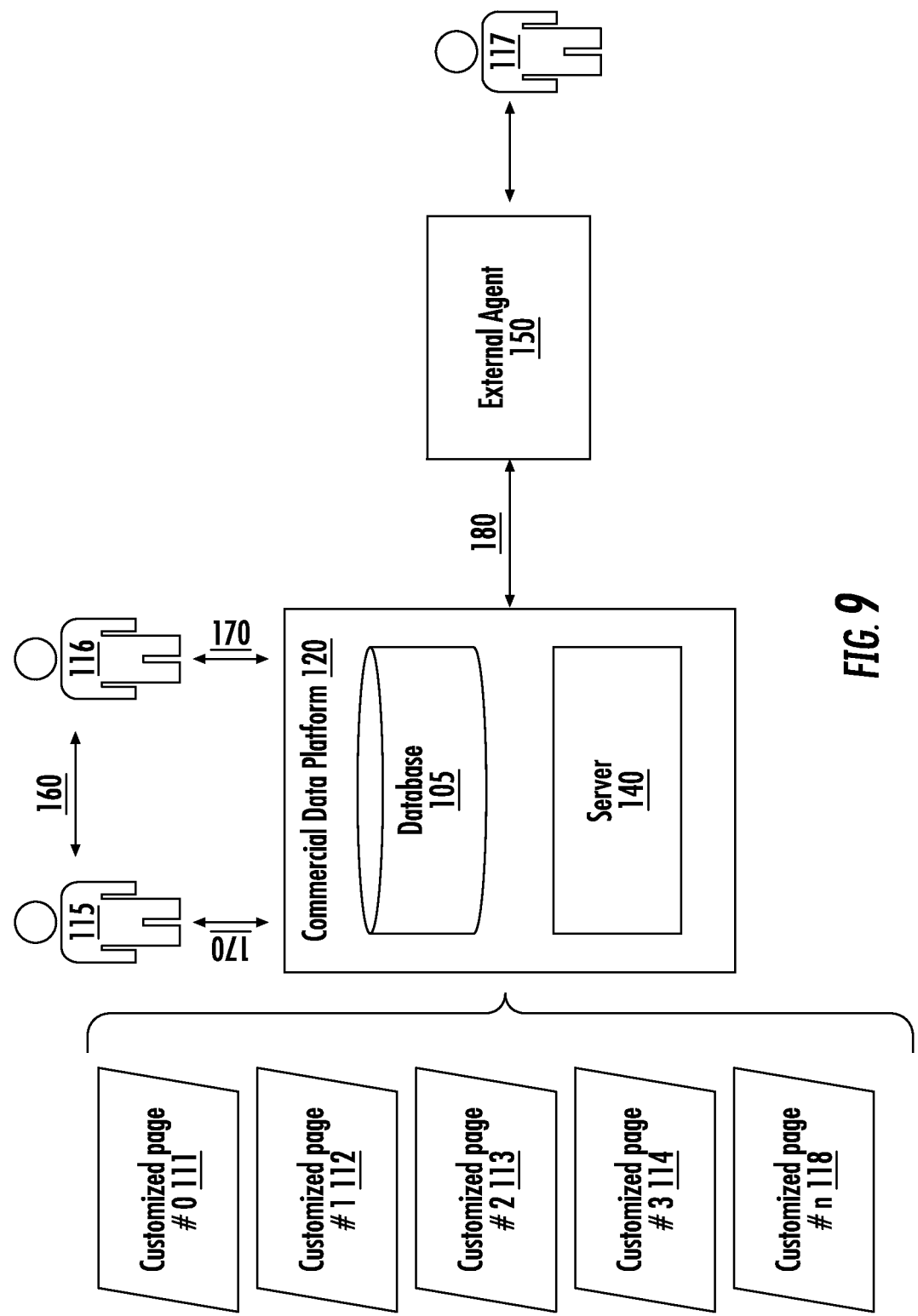
FIG. 9 illustrates the use of customized pages by the commercial data platform and external agents in accordance with specific embodiments of the present invention.

FIG. 9 illustrates an example of the overall operation logic of specific embodiments of the platform and use of customized pages. Customized pages 111, 112, 113, 114 and 118 refer to customized business and individual profiles number 0 to n that can include standard or unique storefronts, photos, videos, promotions, offers, information, data of the relationship value, scores, and any other information developed for the specific profiles, converted into customized pages including home pages, landing pages, splash pages, etc. The commercial data platform 120 can provide a plurality of customized pages depending on a plurality of factors. For example, customized page 111 can be a customized page for all new prospective customers, customized page 112 can be a customized page for customers grade A++, customized page 113 can be a customized page for customers grade B, customized page 114 can be a customized page for customers grade C, and customized page 118 can be a customized page for customers grade m. The customized pages are used internally by the platform and can also be published to the Internet so that they can be found by other platforms, search engines and social networks.

The commercial data platform 120 of the present invention allows for the processing of data from the database 130 through the use of AI, Big Data and Blockchain lookup and outputs the customized pages that can be preconfigured and interactive. The platform can match phone call parties and output the respective customized page to each party, who can view the pages in their screens, for example, via the interaction managers and display managers. The processing can be carried out by server 140 of the commercial data platform 120.

At the same time, external agents 150 can match up their customer values with access to the platform relationship value, or by using the metadata embedded in the published pages. The external agents 150 can return search results with ranking based on data from the platform, such as relationship value. Search engine results can be output via knowledge graphs, knowledge cards, organic link pages, via voice response or in social media search returns, using a relationship value ranking factor and criteria being incorporated into their search algorithms to serve up best matched rankings.

In the example of FIG. 9, user 115 can be a customer grade A++ of the platform accessing data stored in the database 130 during a voice call with another platform user 116 over a voice channel 160, or directly through a data channel 170 without establishing any voice call. The platform will provide user 115 with customized page 111, that is a customized page for customers grade A++. The customized page can be further configured considering the specific user 115 profile and other dynamic information in the platform, for example, the interaction history between user 115 and user 116.

On the other side, user 117 can be a platform user or a non-platform user using an external agent, such as a search engine or social media application. User 117 can be able to find customized pages that have been made available to the external agents by the platform and benefit from the information provided. The external agent will be able to communicate with the platform over channel 180 that can be a dedicated data channel. If user 117 turns out to be a platform user, the customized page can be further configured with profile information of user 117 already stored by the platform, even though user 117 is not accessing the data directly through the platform. Regardless of whether the user is a platform user or not, the external agents will be able to obtain data from the platform and combine it with their own data, so that the final user receives customized content. In this way, the mined data from the database and related information can be made available via the pages generated by the platform to users, whether they are directly using the platform or accessing the data through an external agent communicatively connected to the platform.

The rankings and grades described above herein can be awarded or otherwise updated in various ways to create a virtuous cycle for both increasing uptake of users for the platform, increasing engagement by existing users of the commercial data platform, and incentivizing usages of the commercial data platform that benefit the users themselves and the broader economy. As in certain embodiments of the present invention users are both consumers and producers of content in the form of both social interaction data and commercial interaction data, a network topology of the commercial data platform will be able to illustrate the circulating beneficial flow of social content and streams of commerce through the commercial data platform. This data can then be mined and utilized to reward users with increased visibility and/or prestige. These users can be rewarded for taking actions which increase the velocity of content moving through the commercial data platform. This creates a virtuous cycle in that users that increase the velocity of content through the platform are rewarded with additional visibility which compounds their impact. Additionally, this type of ranking provides highly useful data to users of the commercial data platform because it is difficult to spoof. While an unscrupulous party may provide themselves with a bogus rating on a standard customer survey website, ranking people based on their impact on the overall velocity of interaction data both directly with counterparties and through distal nodes in the network topology is difficult to spoof. The resulting system therefore benefits consumers on the commercial data platform by providing them with accurate information for guiding their consumption decisions, benefits producers that are behaving in accordance with the overall ethos of the administrators of the commercial data platform, and benefits the commercial data platform by increasing utilization of the platform itself and by assuring that the ethos of the commercial data platform and benefits to the wider social fabric and economy are enhanced.

Algorithms such as PageRank, that ranked a webpage based on the number of links to that page, provide a ranking depending on facts that are directly related to the object being raked, such as the number of links, number of "likes", number of "views", etc. That kind of ranking can be easier to spoof in that it depends on a measurable quality that can be increased by users that are not verified users. Specific embodiments of the present invention, however, provide a ranking strategy that considers not only direct and real interactions between two parties, but also the overall flow of the content shared during that interaction throughout the network. For example, a business can be ranked not only because it has a large number of clients who spend a certain amount of money on the business, but also because the business itself otherwise injects money in a network that can benefit its clients as well.

In specific embodiments of the invention, a server, such as server 104 of FIG. 1, can be programmed to update a ranking associated with the users of the platform. For example, the ranking can be associated with the receivers (or receiver identifiers) and the dialers (or dialer identifiers) described before in this disclosure. The ranking can be associated with a profile of the users, such as the receiver profiles and the dialers profiles described before in this disclosure. The ranking can be associated with specific aspects of the user's profiles, such as the profile selections described before in this disclosure. In specific embodiments of the invention, the ranking can be based on grades that the platform affords to each user based on their behavior and interactions within the platform. An example of such ranking and grades was presented, for example, in profiles 305 and 306 illustrated in FIG. 3. The rankings can be updated in various ways and based on a plurality of factors.

In specific embodiments of the invention, the rankings can be updated based on a content quality metric. The content quality metric can be associated with the interaction data stored by the system. The interaction data can be any data relating to the interactions between users (such as dialers and receivers), as explained before in this disclosure. The content quality metric can be indicative of the quality of such interaction data, or at least of an aspect of it. The content quality metric can be related to different aspects of the interactions between dialers and receivers. For example, the content quality metric can be determined based on the amount of money, or any specific currency used by the commercial data platform, that is exchanged during an interaction, and/or over time in a given dialer/receiver relationship. The content quality metric can be also determined based on the data exchanged among the interactions. For example, the quality, uniqueness and reliability of the data can be considered. The content quality metric can be determined by examining the source of the data being shared in a given interaction.

In specific embodiments of the invention, rankings can be provided and badges awarded in a way that guides a relationship economy. In addition to increasing the flow of value within a community and preventing the accumulation of wealth in silos that do not contribute to the overall health of the economy as described above, the platform can incentives content producers and vendors of goods and services using the platform to differentiate based on creativity and added experiential production instead of price. In these embodiments, the content quality metric can be generated based on an evaluation of the distinctiveness of the content created and shared using the platform, or the distinctiveness of the good or service provided using the platform. In the case of digital content, a relative difference of the digital encoding of the content compared to the stored interaction content can be generated using an adversarial neural network that is continuously trained to generate content that is different than the content stored in the commercial data platform and a neural network that is trained to rate the content generated by the adversarial neural network as distinct and the content stored in commercial data platform as not distinct. In the context of physical goods and services, an evaluation of the distinctiveness of the goods and services can be conducted by a natural language processing system operating on reviews or feedback provided in exchange for the goods and services or from marketing materials (e.g., menus or services lists) shared, posted, or otherwise accessible to the commercial data platform (e.g., the sale of a pizza which is listed as "Pepperoni Pizza" on a first menu is associated with a lower content quality metric than the content quality metric associated with the sale of a pizza which is listed as "Mario's Pepperoni Surprise Pizza" on another menu). By rewarding vendors, and users generally, for sharing original content, selling unique products, and providing unique experiences, the economy that is within the ambit of the commercial data platform will be democratized and benefit small business and the diffusion of resources while at the same time moving the focus of competition away from only driving the reduction of price to also driving an increased array of human experiences and relationships.

In specific embodiments of the invention, a database of the system, for example database 105 of FIG. 1 or other database, stores the content quality metric. The content quality metric can be stored in association with the interaction data stored by the system and/or with the individual user identifiers or profiles. As used in this disclosure, the content quality metric can be "stored" in the database either explicitly or implicitly. In other words, the content quality metric can be explicitly stored as a value in a data structure that the system can have access to, or implicitly in that the content quality metric can be derived from data stored in the database and the relationship therebetween.

The content quality metric can be dynamically updated by the system. Multiple factors can be considered in determining the content quality metric. For the purposes of this disclosure, any factor that can be used to evaluate the quality of the interactions can be used to determine the content quality metric. The quality of an interaction can also be system-specific as what is valuable for a system may not be valuable for another (e.g. payment platforms can consider amount of currency as their measure of content quality while social media platforms can consider the type, amount or quality of data being shared). The system can analyze the interaction data being stored and increase or decrease the content quality metric based on such interaction data. For example, the amount of a currency exchanged during an interaction can be analyzed and the content quality metric updated accordingly. Similarly, the amount and/or quality of the data exchanged can be analyzed and the content quality metric updated accordingly. The content quality metric can also be updated based on other factors such as a social kindness factor. For example, machine analysis could be used to measure customer satisfaction in a given call (e.g., tone of voice systems used to detect unhappy customers in a call center). The content quality metric can also be updated based on a recurrency and/or loyalty factor, in that the number of repeat customers, repeat orders, repeat interactions, etc. can be used to determine the quality of a given relationship or overall behavior of individual users (customers/business and/or dialers/receivers). The content quality metric can also be updated based on frequency of interactions. For example, users who are active within the platform can be afforded a higher content quality metric than a user who do not use the platform often.

The content quality metric can be velocity-rewarded in that it can decrease over time such that a velocity of the interaction data impacts the ranking associated with the users of the platform. For example, the content quality metric can decrease over time and increase based on the recurrent use of the platform to share content, for example money or data. As an example, if the content being shared is currency, the content quality metric can increase depending on the amount of currency spent by a given user, but also depending on the frequency that the given user spends or receives currency through the platform. If the user spends a large amount on a one-time interaction, the content quality metric can increase considerably based on the large amount spent. However, if the user does not continue to interact via the platform, the content quality metric can decrease over time regardless of the value spent on the one-time interaction. The content quality metric can also be influenced by the speed of further sharing of the content. For example, if a user spends a single unit of currency issued by the commercial data platform (e.g., a gold coin), the content quality metric of that interaction can be set to a specific level (e.g., 100). However, if the recipient of that coin then quickly spends currency issued by the commercial data platform (e.g., the "same" gold coin), then the content quality metric associated with the original transfer of content can be increased (e.g., 100 to 110 if the recipient spends the currency within one day and 100 to 150 if the recipient spends the currency within one hour). The benefit of the continued rapid sharing of the content can continue to ripple back to the original sharing event. In specific embodiments, the level of benefit may be reduced with the distance through the topology from the original users. However, if the content is fully replicable (e.g., a custom generated emoji as opposed to a unit of currency), the level of benefit may carry back to the original sharing event regardless of the specific branch that the content travels our from that original event. In such a case, the content quality metric may increase exponentially for a piece of content that virally spreads through the platform even if the original author only shared it with one recipient.

In specific embodiments of the invention, the content quality metric can be recharged when the content previously exchanged is shared. For example, if the currency spent by the one-time interaction mentioned before continues to circulate within the platform among other users, then the content quality metric associated to that first one-time interaction can be restored to a base value, based on its impact in the overall ecosystem. In this way, when there is a stored content quality metric associated to the interaction data of a given interaction between a dialer identifier and a receiver identifier that decreased over time (due to inactivity, for example), the stored content quality metric can be restored to a base value when the interaction data is stored in association with a subsequent receiver identifier and the previous receiver identifier.

In this way, and as explained before, the ranking afforded by the commercial data platform is not based only on measurable assets shared in each individual interaction, but how those assets continue to enrich the platform and benefit more users of it. This can provide businesses with incentives in that a business can be more likely to share earned resources through the platform so that its ranking increases.

This can also provide business with incentives in that a customer can be more likely to spend their resources on a business well ranked so that they ultimately benefit from it too.

Figure 10:
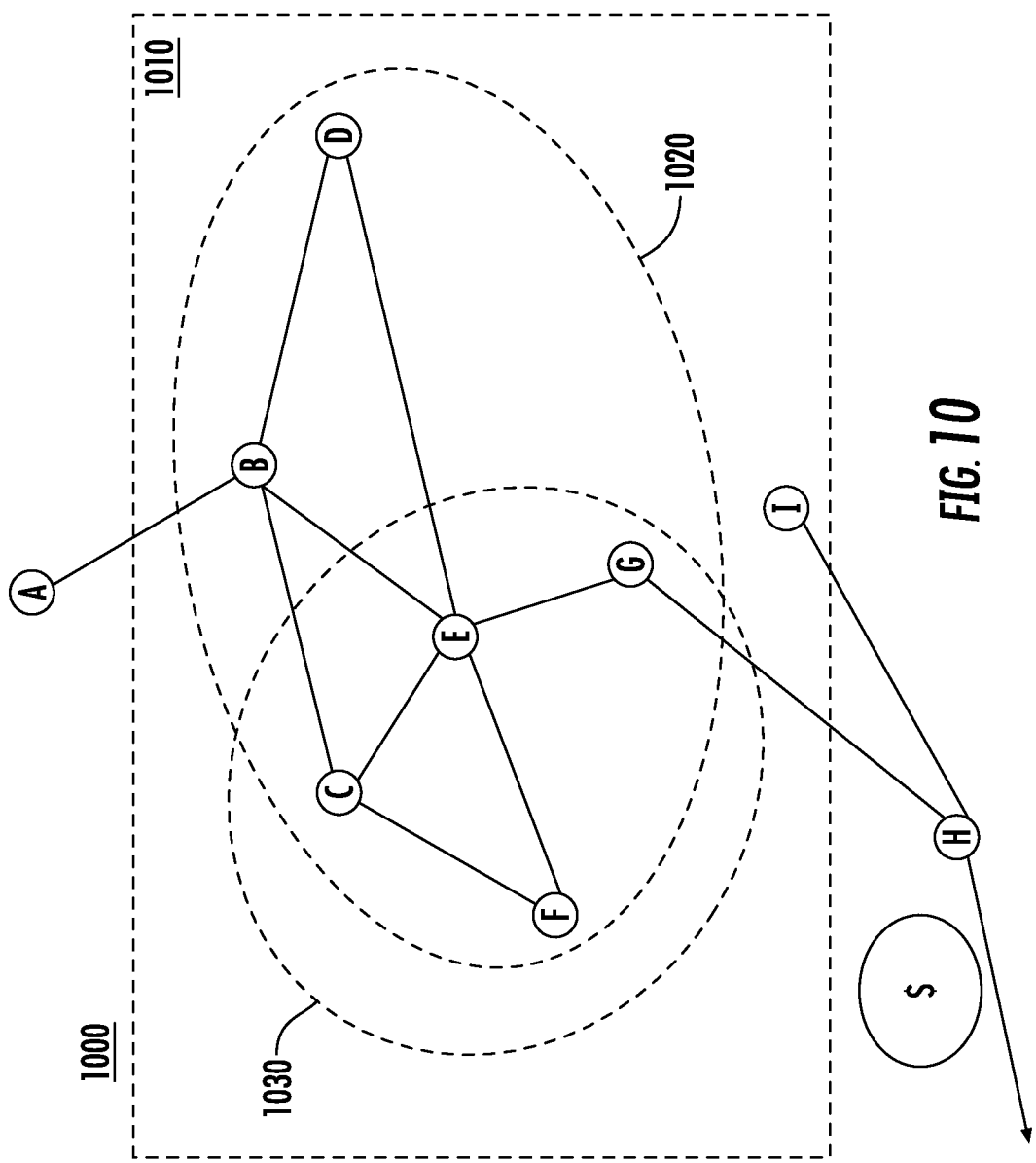
FIG. 10 illustrates an example of a network topology in accordance with specific embodiments of the present invention.

In specific embodiments of the invention, the rankings can be updated based on a network topology. The network topology can be a topology of the network formed by the users of the platform and the interactions between them. FIG. 10 illustrates an example of a network topology 1000 in accordance with specific embodiments of the present invention. The users of the commercial data platform (or their respective user identifier) can be associated with nodes in the network topology and be connected by edges in the network topology. In the example of FIG. 10, the network topology includes nodes A, B, C, D, E, F, G, and H, which can be associated with eight different users of the system, either dialers or receivers. The users can be represented in the topology by their respective user identifier (such as dialer identifier and/or receiver identifier) in that A, B, C, D, E F, G, and H can be for example phone numbers or other ID for users associated to the specific node in the topology. The interactions between users can be associated with the edges in the network topology. In this way, an interaction between user A and user B can be associated with the edge AB. The network topology illustrated in FIG. 10 is for explicative purposes only. The specific network topology and number of nodes and edges will depend on the actual implementation of the system, and the number and distribution of users therein.

In specific embodiments of the invention, a database of the system, for example database 105 of FIG. 1 or other database, stores the network topology. As used in this disclosure, the network topology can be "stored" in the database either explicitly or implicitly. In other words, the network topology can be explicitly stored in a data structure that the system can have access to, or implicitly in that the network topology can be derived from data stored in the database and the relationship therebetween.

The network topology can be dynamically generated based on the data stored in the database. For example, the network topology can be stored in a data structure that the system can process to identify the nodes and connections between nodes of the network. The network topology can be stored in the form of a diagram or map that the system can read. The network topology can be stored in a topology database or set of relational databases that keep track of the current state of the network and connections between nodes. The network topology could be built and updated progressively as new users join the platform, and/or new interactions occur.

A server, such as server 104 of FIG. 1, could operate in combination with the database to either access the network topology already stored therein or to access data to dynamically generate the network topology. For example, the server could query the database for data related to a specific user (such as a dialer) as explained before in this disclosure. The database could provide an association of users (such as receivers) with which the dialer has had interactions, so that the server can dynamically build the topology for the specific node associated to the dialer identifier. The process could go as far in the topology as needed, in that indirect interactions between users can also be mapped by further querying the database for data related to the association of receivers provided for the given dialer.

In specific embodiments of the invention, the rankings can be updated based on an edge strength metric. The edge strength metric can be indicative of the strength of the edge in that it can be specific to the amount of interaction in a node-to-node or user-to-user relationship. The edges in the topology can be based on prior interactions between the nodes of the topology and increase in strength as the users exchange more content. In specific embodiments of the invention, the edge strength metric can be, or can be derived from, the confidence levels described before in this disclosure. As described, the confidence level could rise based on how much interaction had taken place using the platform between users, and whether those interactions were positive or not. In this way, the edge strength metric can be a confidence level for two users, such as a dialer identifier stored in association with a receiver identifier. In specific embodiments of the invention, all the edges in the topology can be associated with a confidence level of at least one and increase over time as more interaction takes place.

In specific embodiments of the invention, a database of the system, for example database 105 of FIG. 1 or other database, stores the edge strength metric. The edge strength metric can be stored in association with the nodes of the network topology as stored by the system. As used in this disclosure, the edge strength metric can be "stored" in the database either explicitly or implicitly. In other words, the edge strength metric can be explicitly stored as a value in a data structure that the system can have access to, or implicitly in that the edge strength metric can be derived from data stored in the database and the relationship therebetween.

The edge strength metric can be determined and updated by the system based on various factors. As explained, the edge strength metric can be based on the amount of prior interaction data associated with the nodes defining the edge (nodes defining an edge can be associated with a dialer identifier and a receiver identifier, two users, a customer and business, two customers, two business, etc.). The edge strength metric can also be determined based on trust, recurrency, and other factors.

In specific embodiments of the invention, the edge strength metric can also be based on a geographical location, such as a geographical location associated with the nodes. In this way, physical proximity between the users can be considered to afford an edge strength metric. This can contribute to a measure of the local impact of the interactions within the platform as a strong link between two users on the same geographical location may indicate that a customer is supporting a local business contributing to the development of the local economy.

The rankings associated to the users of the platform can therefore be dynamic rankings updated based on different metrics and factors, such as the content quality metric, the network topology and the edge strength metric described before. In this way, the rankings can be updated considering actual interactions and verified relationships between users, and the actual content shared during those interactions and its flow throughout the network. Specific embodiments of the invention consider not only the interactions themselves between the users to update the rankings, but also the content exchanged, how that content flows through the platform and/or outside the platform, and the relationship between the users, either direct or indirect, as defined by the network topology.

In specific embodiments of the invention, the ranking associated to a given user can be updated based on a proximity of that user to other users according to the network topology. In this way, the ranking can be updated considering how many links or edges apart nodes are in the topology. The degree of proximity can be determined based on how far apart two nodes are in the topology and the number of nodes between them. Two nodes in the topology can be connected directly, which represents a direct interaction between the nodes, represented by a single edge in the topology. Two nodes in the topology can be connected indirectly, which represents an indirect interaction between the nodes, represented by two or more edges in the topology, and including one or more intermediary nodes. Nodes can be connected indirectly when content exchanged in a first interaction between to nodes passes on to a third node in a subsequent interaction. This can increase the ranking of both the source node in that its content is flowing further through the network, and the intermediate node in that it is not only consuming but also sharing content for the network and therefore contributing to the overall flow of interactions in the network.

With reference to the example of FIG. 10, user E is directly connected to B, C, D, F and G and indirectly connected to users A and H, via users B and G, respectively. In this example, node E can be a costumer (or dialer), and nodes B, C, D, F and G can all be businesses or other "receivers" with which customer E has a direct relationship with, such as restaurants, hotels, gas stations, a friend that is also user of the platform, etc. The reference as dialers and receivers is not fixed and can be interchanged depending on who starts an interaction, a same node can be both dialer and receiver at different times. In this example, node E can be a customer at a hotel B and restaurant C and spend money thereon. Hotel B, in turn, could have a partnership with restaurant C, in that per each night at hotel B customers area forded a cash back to spend at C. Customer B therefore can be more interested in staying at hotel B than any other hotel that does not give them any return of their investment.

The ranking associated to a given user (dialer/receiver) can be updated based on the proximity of the counterparty user (receiver/dialer) to a group of users directly linked to the given user. For example, user E is directly connected to user D. User D is in turn directly connected to user B, which is part of the group of users directly connected to user E. In this case, interactions between user E and D can increase the ranking of user E more than interactions between users E and G, because user G is not connected to any other user that is part of a group where user E has a direct connection with. User D, in turn, is closer (in this example directly connected) to a group of users to which user E is also connected to in the topology. This can mean that the flow of content (for example money) from the ED interactions circulates within a given ecosystem in the platform that can have an effect on user B and back on user E. This can be particularly relevant for analyzing how customers and business spend their resources and how it affects their local economy or individual interests. A ranking based on such proximity concerns can be beneficial to give users an overview of where, how and with whom to invest their resources depending on how they which that investment to unfold.

The ranking associated to a given user (dialer/receiver) can be updated based on the proximity of the counterparty user (receiver/dialer) to a group of users that share a characteristic with the given user. For example, the characteristic can be a geographical location, a type of user, a type of business, a degree of proximity, a common interest, a common node in the topology, etc. For example, a user (or user identifier) can be in a group of users (or user identifiers) in the topology. The group of users (or user identifiers) can be grouped based on the shared characteristic described above, such as a geographical location. The updating of the ranking associated with the user (or user identifier) can be based on a proximity of the counterparty user (or user identifier) to the group of users (or user identifiers) in the topology.

The groups of nodes can be created dynamically based on interactions. For example, edges of the topology can be the records of interactions between nodes, and a group can be centered on a node and include everyone that has a proximity of a certain degree (for example, less than 4 edges apart from that node). In this way, groups can be created dynamically as more interaction occurs within the network. Since the groups do not necessarily relate to a physical proximity of the nodes, the groups can be virtual communities that are dynamically formed or updated even when the "center" node has not had any new direct interaction within the network. The content quality metrics and network topology can impact rankings based on the strength and connection of specific the edges, but also based on the location of nodes within different groups.

With reference back to the example in FIG. 10, nodes C, E, F, and G are grouped in a group 1030. In specific embodiments of the invention, as the rank can be based on both content quality and network topology, sharing content (e.g., money) with someone that keeps the content in the local ecosystem can improve your rank more. The nodes included in group 1030 can share a common characteristic such as geographical location. The geographical location can be based on a user's address or "home" location established in their profiles, or on a current location such as by the use of a GPS system, so that the users can enjoy the benefits of the system either in their "home" ecosystem or in any local ecosystem where they are currently located. In this example, interactions between user E and G can increase the ranking of user E more than interactions between users E and D, because user G is part of the same group 1030 while user D is not. In the same way, interactions between user E and B can increase the ranking of user E more than interactions between users E and D, because user B is otherwise directly connected to the same group 1030 via node C, while user D is otherwise one node apart from group 1030.

The simplified example of FIG. 10 illustrates nodes within the same group that are connected to each other, however, this is not a limitation of the invention as users that have not had any previous interactions (and therefore would have no edge between them in the topology) can still share a common characteristic such as the same geographical location. Furthermore, the examples given herein as to what can increase or decrease a ranking are illustrative of how the combination of a network topology with the different metrics disclosed herein can be used to update the rankings. However, those examples are non-limiting and what can increase the ranking in one example (e.g., same geographical location to boost local economy) can decrease it in others (e.g., if it is desired to incentivize users to interact with users from a different location). The constraints of each particular system can be different and therefore the weights of what increases/decreases a ranking can vary. In some embodiments, the fact that two nodes belong to the same group can increase the ranking of the nodes considerably. In other embodiments, the quantity of interactions between nodes can increase your ranking more regardless of the group that the nodes belong to. In other embodiments, the quality of interactions between nodes can increase your ranking more regardless of the group that the nodes belong to and the quantity of interactions. These and more options are possible and customizable by programming the server to update the ranking accordingly.

The users (or user identifiers) can also be grouped by sharing a degree of proximity to a given user (or user identifier) in the topology. The updating of the ranking associated with the given user (or user identifier) can be based on a proximity of the counterparty user identifier to the group of identifiers in the topology. For example, FIG. 10 illustrates a group 1020 that includes nodes directly connected to node E, this is, nodes with a first degree of proximity to node E. Nodes A and H, for example, are nodes with a second degree of proximity to node E, in that they are indirectly connected via an intermediate node. Node I is a node with a third degree of proximity to node E, in that it is indirectly connected via two intermediate nodes.

In specific embodiments of the invention, the network topology includes one or more nodes for external users (or user identifiers), that are not users of the platform yet. In the example of FIG. 10, users within box 1010 can be users of the platform, while users A and H can be external users. As illustrated, the external users, such as A and H, can be connected to users of the platform and interact with them, as indicated by edges HG, HI and AB. In this way, external users can be either consumers or producers of content for the platform and can likewise have an impact on the overall flux of content through the different nodes and groups in the network topology.

The external user can be connected to the users of the platform by an edge with an associated edge strength metric in the same way as was described above for other nodes in the topology. In this way, the updating of the ranking can be based on the edge strength metric associated with the edge to the external user (or user identifier). For example, the amount of interaction between a user of the platform, such as user G, with an external user, such as user H, can be considered in determining a raking for user G. In specific embodiments of the invention, a ranking of a user that changes content with an external user can be higher if the external user otherwise exchanges content with the platform. For example, a ranking for user G can be higher because external user H interacts with user I, which is also a user of the platform. This can be beneficial in that content, such as currency that is spent outside of the platform is likely to return to the original ecosystem. This can also be beneficial in that user H can be a potential user of the platform as it learns the incentives of its direct interaction with more than one user therein.

In specific embodiments of the invention, the interaction data records payment of currency. The currency can be any currency, including digital currency such as virtual currency and cryptocurrency. In specific embodiments of the invention, the currency is issued by a server of the commercial data platform of the present invention, such as server 104 of FIG. 1 or other server. The currency can be issued in the name of the administrator of the commercial data platform, merchants that register to issue currency via the platform, or by individual users. The server can store one or more currency balances for the users (or user identifiers), including any external user of the platform. The currency can be offered as rewards for users of the systems during the course of their interactions as an incentive to utilize the commercial data platform, issued in exchange for funds transferred to the administrator of the platform, or rewarded by merchants on the commercial data platform as a way to build stronger ties with specific customers. In this way, a ranking can be updated based on an edge strength metric with the external users and with the amount of currency (or other content) as recorded by the system. Alternatively, the server can be programmed to update a distributed ledger for the currency when processing transactions of the currency. The distributed ledger could use any form of DLT including Blockchain and Holochain. The distributed ledger can include a cryptographic hash of the external user (or external user identifier) and can track the amount of currency held by users of the commercial data platform as well as that of external users. The transfer of funds between users can be controlled using the distributed ledger and a set of private keys held by the parties to the transaction. This distributed ledger could be mined to provide information for the network topology mentioned above regardless of whether the participants to the transactions for the currency were registered members of the commercial data platform. While finer grained information could be obtained if the users were registered members, a distributed ledger could expand the topology out to mine information about the broader economy. As such, the currency (or currencies) can be used to pull more data into the commercial data platform thereby extending the visibility and reach of the search algorithms and other agents that utilize the data harvested by the platform to include transactions beyond the horizon set by the registered users of the commercial data platform.

In specific embodiments of the invention the rankings can be generated using the metrics for a search algorithm (i.e., the users will be provided with a ranking or various rankings that will be used to sort the users in response to various search queries). The search algorithm can utilize the information from the content quality metrics and the network topology to provide search results for various queries such as, "which vendor of good Y benefits my local economy the most" or "which vendor of good X has the most repeat customers for service Y." As the network topology monitors the strength of connections between specific users of the platform various proprietary and/or open-source search algorithms will have access to the underlying fundamental economic data that can provide accurate rankings for a myriad of such targeted search queries. Depending upon the level of transparency the additional contingencies for these search queries can be built into the ranking system and unseen to the user (e.g., a proprietary search algorithm for "pizza near me" favors pizza places that benefit the local economy), or they can be provided as options for the users of the system (e.g., a search wizard for "pizza near me" allows a user to check boxes for other factors they are interested in such as only showing results for pizza vendors that benefit the local economy above some preset degree).

The rankings associated with the users of the platform can be used in different ways. For example, the rankings can be used to rank the users (or user identifiers) for an internal searching agent. In this way, the ranking can be used to provide a rank that is internal to the commercial data platform and that can be used for example by proprietary applications to surface content to the users. The rankings can also be surfaced to external searching agents. The surfacing to the external searching agent can be performed as described before in this disclosure for the surfacing of interaction data and derivatives thereof. The surfacing can be performed using an external data channel and without using any voice channel.

By surfacing the rankings to searching agents, users of the searching agent can be provided with information about the users of the platform that includes the rankings associated with them. For example, if a user is using a searching agent to search for a business that is part of the platform, the business will be ranked based on the factors described above (such as content quality metrics, network topology, edge strength metric, etc.) In this way, the business can be ranked based on their own use of the platform not only as businesses but also as consumers. The rankings can then provide information that can help the user make a decision that considers not only the direct counterparty in a given interaction but also their connection with other nodes in the network topology and the complete flow of content between them.

The external agent can be the external agent described before in this disclosure and include, for example, a web browser, an external application proprietarily programmed to interoperate with the server, a third-party external application, an intelligent searching agent, a recommendation engine, etc. A server of the system, such as server 104 of FIG. 1 or other server, can be programmed to generate a user's page using a content management system (CMS), as explained before in this disclosure. The CMS can populate the user page to produce a populated user page using the ranking associated with the user (or user identifier). The CMS can populate the user page with the ranking in the form of a badge on the user page.

Figure 11:
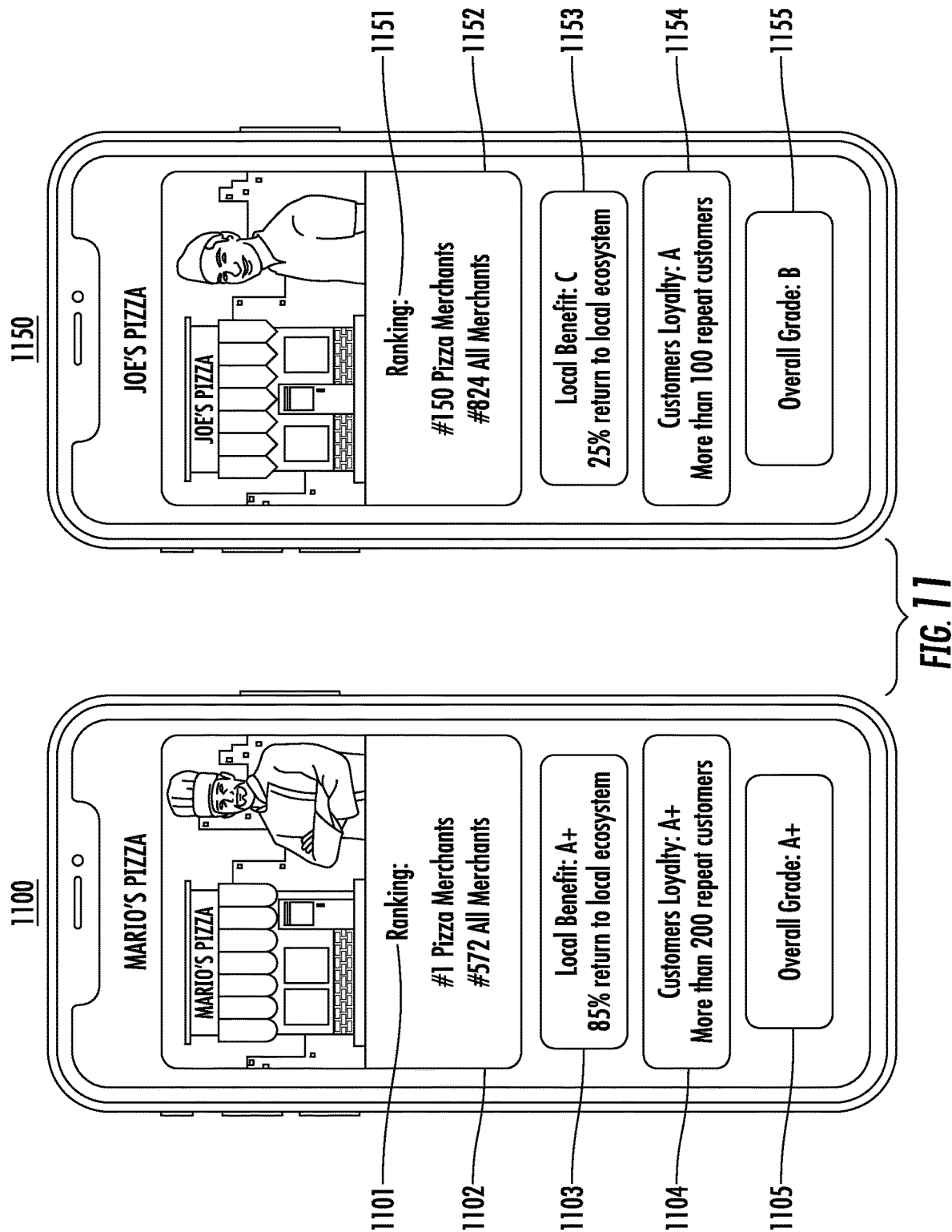
FIG. 11 illustrates two examples of user pages that include rankings and badges in accordance with specific embodiments of the present invention.

FIG. 11 illustrates two examples of user pages 1100 and 1150 that include the rankings 1101 and 1151, which can be updated as described before in this disclosure. The rankings are provided in the form of badges 1102 and 1152. In the example of FIG. 11, the badges 1102 and 1152 each include two different rankings, one among pizza merchants and one among all merchants in the platform. This is an example of the different groups that can be defined within the network topology based on a shared characteristic. In this example, all pizza merchants can be part of a same group in the topology, and the ranking can be updated based on the edges and interactions among such group. In this way, a user using the platform to obtain information such as the rankings illustrated in FIG. 11 can be provided with the option of filtering specific characteristics and therefore defining groups in the topology to obtain a dedicated ranking specific to their needs.

The profiles 1100 and 1150 can be profiles surfaced to an external agent when a user a searching for information in the platform. Profile 1100 is a Mario's Pizza profile and profile 1150 is a Joe's Pizza profile. Those profiles can be returned as a result of a search for a user that is interested in a Pizza place nearby. Those two examples are provided for explanatory purposes. The real number of profiles returned for a given search can be more than two. From the list of profiles returned, and the information contained therein, for example in badges 1102 and 1152, the user can make a reasonable decision by inspecting the rankings 1101 and 1151 and understanding that Mario is overall a better option than Joe. Because the ranking is determined based on factors such as the content quality metric and the network topology, a simple inspection to the number can give the user a prompt conclusion as to the impact of interacting with one or the other. Because the user searching for information can be a user of the platform and therefor be associated with a node in the network topology as well, the ranking provided may be personalized by considering the user's own interactions, content quality metric associated with user, edges in the network topology associated with the user, etc.

The examples of FIG. 11 illustrate additional information that can also be provided in a user profile, for example in the form of badges, so that the user can better understand the behavior of the business searched in regard to specific aspects. Badges 1103 and 1153 include a local benefit grade. This grade can be based, for example, on an amount of money or resources that return to the local ecosystem once injected on that business. Badges 1104 and 1154 include a customer loyalty grade, which can be based on a number of repeat customers that a given business possess, which can be a direct indicative of the customer's satisfaction with the business. Badges 1105 and 1155 include an overall grade for the business, which can be based on the previous aspects as set in the other badges. These and other data can be surfaced to external agents from the data stored in the commercial data platform of the present invention.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The computer-readable medium may be a memory within a personal user device or a network accessible memory. These and other modifications and variations to the present invention may be practiced by those skilled in the art, without departing from the scope of the present invention, which is more particularly set forth in the appended claims.

What is claimed is:

1. A system comprising:
   a receiver device with a receiver identifier;
   a dialer device with a dialer identifier, wherein the dialer device is configured to initiate a call over a first voice channel with the receiver device using the receiver identifier;
   a database, wherein the database stores: (i) interaction data, collected during the call, in association with both the receiver identifier and the dialer identifier; (ii) a content quality metric in association with the interaction data; and (iii) a network topology in which the receiver identifier and the dialer identifier are associated with nodes in the network topology and are connected by an edge in the network topology; and
   a server, wherein the server is programmed to:
   update, based on the content quality metric and the network topology, a ranking associated with the receiver identifier and a ranking associated with the dialer identifier; and
   one of: (i) surface the ranking associated with the dialer identifier and the ranking associated with the receiver identifier to an external searching agent using an external data channel and without using any voice channel; or (ii) rank the dialer identifier for an internal searching agent using the ranking.

2. The system of claim 1, wherein:
   the stored content quality metric decreases over time such that a velocity of the interaction data impacts the ranking associated with the receiver identifier and the ranking associated with the dialer identifier.

3. The system of claim 2, wherein:
   the stored content quality metric is restored to a base value when the interaction data is stored in association with a second receiver identifier and the receiver identifier.

4. The system of claim 1, wherein:
   the receiver identifier and the dialer identifier are linked by an edge in the network topology;
   the database further stores an edge strength metric for the edge;
   the edge strength metric is based on one of: (i) a geographical location associated with the dialer identifier; (ii) a geographical location associated with the receiver identifier; (iii) an amount of prior interaction data associated with both the dialer identifier and the receiver identifier; and the updating of the ranking associated with the receiver identifier and the ranking associated with the dialer identifier is based on the edge strength metric.

5. The system of claim 1, wherein:

the receiver identifier and the dialer identifier are linked by an edge in the network topology;

the database further stores an edge strength metric for the edge; and the edge strength metric is a confidence level for the dialer identifier stored in association with the receiver identifier.

6. The system of claim 5, wherein:

all of the edges in the network topology are associated with a confidence level of at least one.

7. The system of claim 1, wherein:

the receiver identifier and the dialer identifier are linked by an edge in the network topology;

the dialer identifier is directly connected to a group of identifiers in the network topology; and the updating of the ranking associated with the dialer identifier is based on a proximity of the receiver identifier to the group of identifiers in the network topology.

8. The system of claim 1, wherein:

the receiver identifier and the dialer identifier are linked by an edge in the network topology;

the dialer identifier is in a group of identifiers in the network topology;

the identifiers in the group of identifiers are grouped by sharing a geographical location; and the updating of the ranking associated with the dialer identifier is based on a proximity of the receiver identifier to the group of identifiers in the network topology.

9. The system of claim 1, wherein:

the dialer identifier is in a group of identifiers in the network topology;

the identifiers in the group of identifiers are grouped by sharing a degree of proximity to the dialer identifier in the network topology; and the updating of the ranking associated with the dialer identifier is based on a proximity of the receiver identifier to the group of identifiers in the network topology.

10. The system of claim 1, wherein the external searching agent is one of:

a web browser;

an external application proprietarily programmed to interoperate with the server;

a third party external application;

an intelligent searching agent; and a recommendation engine.

11. The system of claim 1, wherein the server is further programmed to:

receive receiver profile selections; and generate a receiver page using a content management system (CMS);

wherein the CMS populates the receiver page to produce a populated receiver page using the ranking associated with the receiver identifier.

12. The system of claim 1, wherein the server is further programmed to:

generate a dialer page using a content management system (CMS);

wherein the CMS populates the dialer page with the ranking in the form of a badge on the dialer page.

13. The system of claim 1, wherein:

the interaction data records a payment of currency issued by the server;

the server is programmed to store a currency balance for the currency for a set of identifiers;

the set of identifiers include the receiver identifier, the dialer identifier, and an external user identifier; and the network topology includes a node for the external user identifier.

14. The system of claim 13, wherein:

the updating of the ranking based on the network topology includes updating based on an edge strength metric associated with an edge to the external user identifier.

15. The system of claim 1, wherein:

the interaction data records a payment of currency issued by the server;

the server is programmed to update a distributed ledger for the currency when processing transactions of the currency;

the distributed ledger includes a cryptographic hash of an external user identifier; and the network topology includes a node for the external user identifier.

16. The system of claim 15, wherein:

the updating of the ranking based on the network topology includes updating based on an edge strength metric associated with an edge to the external user identifier.

17. The system of claim 1, further comprising:

a first interaction manager on the dialer device;

a second interaction manager on the receiver device; and a data channel formed during the call which includes the first interaction manager, the second interaction manager, and the server;

wherein the interaction data that is collected during the call is sent to the server using the data channel.

18. A server, wherein the server is programmed to:

store, in a database: (i) interaction data, collected during a call, in association with a receiver identifier of a receiver device and a dialer identifier of a dialer device; (ii) a content quality metric in association with the interaction data; and (iii) a network topology in which the receiver identifier and the dialer identifier are associated with nodes in the network topology and are connected by an edge in the network topology;

update, based on the content quality metric and the network topology, a ranking associated with the receiver identifier and a ranking associated with the dialer identifier; and one of: (i) surface the ranking associated with the dialer identifier and the ranking associated with the receiver identifier to an external searching agent using an external data channel and without using any voice channel; or (ii) rank the dialer identifier for an internal searching agent using the ranking.

19. The server of claim 18, wherein:

the stored content quality metric decreases over time such that a velocity of the interaction data impacts the ranking associated with the receiver identifier and the ranking associated with the dialer identifier.

20. The server of claim 18, wherein the external searching agent is one of:

a web browser;

an external application proprietarily programmed to interoperate with the server;

a third party external application;

an intelligent searching agent; and
a recommendation engine.

\* \* \* \* \*